United States Patent
Derakhshani et al.

(10) Patent No.: US 9,311,535 B2
(45) Date of Patent: Apr. 12, 2016

(54) TEXTURE FEATURES FOR BIOMETRIC AUTHENTICATION

(71) Applicant: EyeVerify LLC, Kansas City, KS (US)

(72) Inventors: Reza Derakhshani, Roeland Park, KS (US); Vikas Gottemukkula, Kansas City, KS (US); Casey Hughlett, Lenexa, KS (US)

(73) Assignee: EyeVerify, LLC, Kansas City, KS (US)

( * ) Notice: Subject to any disclaimer, the term of this patent is extended or adjusted under 35 U.S.C. 154(b) by 0 days.

(21) Appl. No.: 14/292,628

(22) Filed: May 30, 2014

(65) Prior Publication Data

US 2014/0270405 A1     Sep. 18, 2014

Related U.S. Application Data

(63) Continuation of application No. 13/950,086, filed on Jul. 24, 2013, now Pat. No. 8,744,141, which is a continuation of application No. 13/758,753, filed on Feb. 4, 2013, now abandoned, which is a continuation of application No. 13/572,188, filed on Aug. 10, 2012, now Pat. No. 8,369,595.

(51) Int. Cl.
*G06K 9/00* (2006.01)

(52) U.S. Cl.
CPC .......... *G06K 9/00597* (2013.01); *G06K 9/0061* (2013.01); *G06K 2009/00932* (2013.01)

(58) Field of Classification Search
None
See application file for complete search history.

(56) References Cited

U.S. PATENT DOCUMENTS

| | | |
|---|---|---|
| 5,291,560 A | 3/1994 | Daugman |
| 5,303,709 A | 4/1994 | Dreher et al. |
| 5,632,282 A | 5/1997 | Hay et al. |
| 6,095,989 A | 8/2000 | Hay et al. |
| 7,031,539 B2 | 4/2006 | Tisse et al. |
| 7,287,013 B2 | 10/2007 | Schneider et al. |
| 7,327,860 B2 | 2/2008 | Derakhshani et al. |

(Continued)

FOREIGN PATENT DOCUMENTS

| | | |
|---|---|---|
| CN | 102496007 A | 6/2012 |
| GB | 2471192 A | 12/2010 |

(Continued)

OTHER PUBLICATIONS

Greenspan, Hayit K., and Rodney Goodman. "Remote sensing image analysis via a texture classification neural network." Adv. Neural Information Proc. Syst, 1993, 9 pages.*

(Continued)

*Primary Examiner* — Sumati Lefkowitz
*Assistant Examiner* — Ryan P Potts
(74) *Attorney, Agent, or Firm* — Goodwin Procter LLP

(57) ABSTRACT

One aspect comprises obtaining one or more image regions from a first image of an eye. Each of the image regions may include a view of a respective portion of the white of the eye. The aspect may further comprise applying several distinct filters to each of the image regions to generate a plurality of respective descriptors for the region. The several distinct filters may include convolutional filters that are each configured to describe one or more aspects of an eye vasculature and in combination describe a visible eye vasculature in a feature space. A match score may be determined based on the generated descriptors and based on one or more descriptors associated with a second image of eye vasculature.

27 Claims, 10 Drawing Sheets

(56) References Cited

U.S. PATENT DOCUMENTS

| | | | |
|---|---|---|---|
| 7,336,806 | B2 | 2/2008 | Schonberg et al. |
| 7,668,351 | B1 | 2/2010 | Soliz et al. |
| 7,925,058 | B2 | 4/2011 | Lee et al. |
| 8,079,711 | B2 | 12/2011 | Stetson et al. |
| 8,090,246 | B2 | 1/2012 | Jelinek |
| 8,251,511 | B2 | 8/2012 | Stetson et al. |
| 8,279,329 | B2 | 10/2012 | Shroff et al. |
| 8,369,595 | B1 | 2/2013 | Derakhshani et al. |
| 8,553,948 | B2 | 10/2013 | Hanna |
| 2005/0281440 | A1 | 12/2005 | Pemer |
| 2006/0058682 | A1 | 3/2006 | Miller et al. |
| 2006/0132790 | A1 | 6/2006 | Gutiin |
| 2007/0291277 | A1 | 12/2007 | Everett et al. |
| 2008/0025574 | A1 | 1/2008 | Morikawa et al. |
| 2008/0298642 | A1 | 12/2008 | Meenen |
| 2009/0304272 | A1* | 12/2009 | Makadia et al. ............. 382/165 |
| 2010/0094262 | A1 | 4/2010 | Tripathi et al. |
| 2010/0128117 | A1 | 5/2010 | Dyer |
| 2010/0271471 | A1 | 10/2010 | Kawasaki et al. |
| 2011/0033091 | A1 | 2/2011 | Fujii et al. |
| 2011/0058712 | A1 | 3/2011 | Sanchez Ramos |
| 2012/0163678 | A1 | 6/2012 | Du et al. |

FOREIGN PATENT DOCUMENTS

| | | |
|---|---|---|
| WO | WO-2006/119425 A2 | 11/2006 |
| WO | WO-2010/129074 A1 | 11/2010 |

OTHER PUBLICATIONS

Bao, Paul. "Image Registration based on Complex Wavelet Pyramid and HVS Modeling." SPIE Conference on Wavelet Applications in Signal and Image Processing VI, Jul. 1998, 13 pages.*

Hasan, I., M. Fatema, and M. A. Amin. "Dual iris based human identification." Computer and Information Technology (ICCIT), 2011 14th International Conference on. IEEE, 2011. 6 pages.*

Simon, Donald L. "A three-dimensional receiver operator characteristic surface diagnostic metric," Annual Conference of the Prognostics and Health Management Society, 2011. 11 pages.*

Bowyer et al., "A Survey of Iris Biometrics Research: 2008-2010," Handbook of Iris Recognition 2013; pp. 15-54; Jan. 2013.

Bowyer et al., "Image Understanding for Iris Biometrics: A Survey," Computer Vision and Image Understanding; 110(2):281-307; May 2008.

Cesar Jr. and Costa, "Neurcal Cell Classification by Wavelets and Multiscale Curvature," Biol Cybern; 79:347-360; Oct. 1998.

Chen et al., "A Texture-Based Method for Classifying Cracked Concrete Surfaces From Digital Images Using Neural Networks," Proc. of Int'l Joint Conference on Neural Networks, IEEE, San Jose, CA; pp. 2632-2637; Jul. 31-Aug. 5, 2011.

Choras, "Ocular Biometrics-Automatic Feature Extraction From Eye Images," Recent Res. in Telecommunications, Informatics, Electronics and Signal Processing; pp. 179-183; May 2011.

Clausi and Jernigan, "Designing Gabor Filters for Optimal Texture Separability," Pattern Recog; 33(11):1835-1849; Nov. 2000.

Costa et al., "Shape Analysis and Classification: Theory and Practice," CRC Press; pp. 608-615; Dec. 2000.

Crihalmeanu et al., "Enhancement and Registration Schemes for Matching Conjunctival Vasculature," Proc. of the 3rd IAPR/IEEE International Conference on Biometrics (ICB), Alghero, Italy; pp. 1247-1256; Jun. 2009.

Crihalmeanu and Ross, "Multispectral Scleral Patterns for Ocular Biometric Recognition," Pattern Recognition Lett; 33(14):1860-1869; Oct. 2012.

Crihalmeanu and Ross, "On the Use of Multispectral Conjunctival Vasculature as a Soft Biometric," Proc. IEEE Workshop on Applications of Computer Vision (WACV), Kona, HI; pp. 204-211; Jan. 2011.

Derakhshani et al., "A New Biometric Modality Based on Conjunctival Vasculature," Proc. of the Artificial Neural Networks in Engineering Conference (ANNIE), St. Louis, MO; pp. 497-504, Nov. 2006.

Derakhshani et al., "A Texture-Based Neural Network Classifier for Biometric Identification Using Ocular Surface Vasculature," Proceedings of International Joint Conference on Neural Networks (IJCNN), Orlando, FL; 6 pgs.; Aug. 2007.

Derakhshani et al., "A Vessel Tracing Algorithm for Human Conjunctival Vasculature," Abstract in Proc. of the Kansas City Life Sciences Institute Research Day Conference, Kansas City, MO; p. 150; Mar. 2006.

Derakhshani et al., "Computational Methods for Objective Assessment of Conjunctival Vascularity," Engineering in Medicine and Biology Society (EMBC), Proc. of the 2012 IEEE Engineering in Medicine and Biology Conference, San Diego, CA; 4pgs; Aug. 28-Sep. 1, 2012.

Gottemukkula et al., "A Texture-Based Method for Identification of Retinal Vasculature," 2011 IEEE International Conference on Technologies for Homeland Security, Waltham, MA; pp. 434-439; Nov. 15-17, 2011.

Grigorescu et al., "Comparison of Texture Features Based on Gabor Filters," IEEE Transactions on Image Processing; 11(10):1160-1167; Oct. 2002.

He et al.; Three-Class ROC Analysis—A Decision Theoretic Approach Under the Ideal Observer Framework; IEEE Transactions on Med Imaging; 25(5):571-581, May 2006.

Int'l Search Report and Written Opinion of the ISA/EP in PCT/US2013/042889; 11 pgs.; Oct. 18, 2013.

Kalka et al. "Estimating and Fusing Quality Factors for Iris Biometric Images," IEEE Transactions on Systems, Man and Cybernetics, Part A: Systems and Humans; 40(3):509-524; May 2010.

Kirbas and Quek, "Vessel Extraction Techniques and Algorithms: A Survey," Proc. of the Third IEEE Symposium on Bioinformatics and Bioengineering, Computer Society, Bethesda, MD; 8pgs; Mar. 10-12, 2003.

Li and Chutatape, "Automated Feature Extraction in Color Retinal Images by a Model Based Approach," IEEE Transactions on Biomed Eng; 51(2):246-254; Feb. 2004.

Liu et al., "Finger Vein Recognition With Manifold Learning," J Network and Computer Appl; 33(3):275-282; May 2010.

Liu et al., "Gabor Feature Based Classification Using the Enhanced Fisher Linear Discriminant Model for Face Recognition," IEEE Transactions on Image Processing; 11(4):467-476; Apr. 2002.

Owen et al., "Optimal Green (Red-free) Digital Imaging of Conjunctival Vasculature," Opthal. Physiol Opt; 22(3):234-243; May 2002.

Proenca, "Quality Assessment of Degraded Iris Images Acquired in the Visible Wavelength," IEEE Transactions on Information Forensics and Security; 6(1):82-95; Mar. 2011.

Randen et al., "Filtering for Texture Classification: A Comparative Study," IEEE Transactions on Pattern Analysis and Machine Intelligence; 21(4):291-310; Apr. 1999.

Saad et al., "Model-Based Blind Image Quality Assessment Using Natural DCT Statistics," IEEE Transactions on Image Processing; X(X):1-12; Dec. 2010.

Schwartz and Berry, "Sophisticated Temporal Pattern Recognition in Retinal Ganglion Cells," J Neurophysiol; 99(4):1787-1798; Feb. 2008.

Sun et al., "Improving Iris Recognition Accuracy Via Cascaded Classifiers," IEEE Transactions on Systems, Man, and Cybernetics—Part C: Applications and Reviews; 35(3):435-441; Aug. 2005.

Tanaka and Kubo, "Biometric Authentication by Hand Vein Patterns," Soc. of Instrument and Control Engineers (SICE) Annual Conference, Sapporo, Japan; pp. 249-253; Aug. 4-6, 2004.

Tanaka, et al.; Texture Segmentation Using Amplitude and Phase Information of Gabor Filters, Elec. Comm. in Japan, Part. 3; 87(4):66-79; Apr. 2004.

Tankasala et al., "Biometric Recognition of Conjunctival Vasculature Using GLCM Features," 2011 Int'l Conference on Image Information Processing (ICIIP), Waknaghat, India; 6pgs; Nov. 3-5, 2011.

Tankasala et al., "Classification of Conjunctival Vasculature Using GLCM Features," 2011 Int'l Conference on Image Information Processing (ICIIP), Waknaghat, India; 6pgs; Nov. 2011.

(56) References Cited

OTHER PUBLICATIONS

Tankasala et al., "Visible Light, Bi-Modal Ocular Biometrics," Proc. of the 2012 2nd International Conference on Communication Computing and Security (ICCCS), Rourkela, India; 9pgs; Oct. 6-8, 2012.

Wu et al., "Extraction and Digitization Method of Blood Vessel in Scleraconjunctiva Image," Int'l J Computer Sci and Network Security; 11(7):113-118; Jul. 2011.

Zhou et al., "A Comprehensive Sclera Image Quality Measure," 2010 11th Int'l. Conf. Control, Automation, Robotics and Vision (ICARCV), Singapore; pp. 638-643; Dec. 7-10, 2010.

Zhou et al., "A New Human Identification Method: Sclera Recognition," IEEE Transactions on Systems, Man, and Cybernetics Part A: Systems and Humans; 42(3):571-583; May 2012.

Zhou et al., "Multi-angle Sclera Recognition System," 2011 IEEE Workshop on Computational Intelligence in Biometrics and Identity Management (CIBIM), Paris; 6pgs; Apr. 11, 2011.

Derakhshani, et al., Translated Official Action in Chinese Application # 201310276024.5, dated Nov. 3, 2014.

Derakhshani, et al., Translated Official Action in Chinese Application # 201310276024.5, dated Jan. 15, 2015.

* cited by examiner

TEXTURE FEATURES FOR BIOMETRIC AUTHENTICATION

CROSS-REFERENCE TO RELATED APPLICATIONS

This application is a continuation of and claims priority to U.S. patent application Ser. No. 13/950,086, filed on Jul. 24, 2013, entitled "Texture Features for Biometric Authentication," which is a continuation of, and claims priority to, U.S. patent application Ser. No. 13/758,753, filed on Feb. 4, 2013, entitled "Texture Features for Biometric Authentication," which is a continuation of, and claims priority to. U.S. Pat. No. 8,369,595, issued Feb. 5, 2013, entitled "Texture Features For Biometric Authentication." The entire contents of the prior applications are hereby incorporated by reference.

TECHNICAL FIELD

The present disclosure relates to biometric authentication based on images of the eye.

BACKGROUND

It is often desirable to restrict access to property or resources to particular individuals. Biometric systems may be used to authenticate the identity of an individual to either grant or deny access to a resource. For example, iris scanners may be used by a biometric security system to identify an individual based on unique structures in the individual's iris.

SUMMARY

This specification describes technologies relating to biometric authentication based on images of the eye. In general, one aspect of the subject matter described in this specification can be embodied in a method that includes obtaining one or more image regions from a first image of an eye, wherein each of the image regions includes a view of a respective portion of vasculature of the eye external to a corneal limbus boundary of the eye. The method may further include applying several distinct filters to each of the image regions to generate a plurality of respective descriptors for the region. The several distinct filters may include a plurality of convolutional filters that are each configured to describe one or more aspects of an eye vasculature and in combination describe a visible eye vasculature in a feature space. The method may further include determining a match score based on the generated descriptors and based on one or more descriptors associated with a second image of eye vasculature.

In general, one aspect of the subject matter described in this specification can be embodied in a system that includes a module configured to obtain one or more image regions from a first image of an eye, wherein each of the image regions includes a view of a respective portion of vasculature of the eye external to a corneal limbus boundary of the eye. The system may further include a means for applying several distinct filters to each of the image regions to generate a plurality of respective descriptors for the region. The several distinct filters may include a plurality of convolutional filters that are each configured to describe one or more aspects of an eye vasculature and in combination describe a visible eye vasculature in a feature space. The system may further include a module configured to determine a match score based on the generated descriptors and based on one or more descriptors associated with a second image of eye vasculature.

In general, one aspect of the subject matter described in this specification can be embodied in a system that includes a data processing apparatus and a memory coupled to the data processing apparatus. The memory having instructions stored thereon which, when executed by the data processing apparatus cause the data processing apparatus to perform operations including obtaining one or more image regions from a first image of an eye, wherein each of the image regions includes a view of a respective portion of vasculature of the eye external to a corneal limbus boundary of the eye. The operations may further include applying several distinct filters to each of the image regions to generate a plurality of respective descriptors for the region. The several distinct filters may include a plurality of convolutional filters that are each configured to describe one or more aspects of an eye vasculature and in combination describe a visible eye vasculature in a feature space. The operations may further include determining a match score based on the generated descriptors and based on one or more descriptors associated with a second image of eye vasculature.

In general, one aspect of the subject matter described in this specification can be embodied in a computer readable media storing software including instructions executable by a processing device that upon such execution cause the processing device to perform operations that include obtaining one or more image regions from a first image of an eye, wherein each of the image regions includes a view of a respective portion of vasculature of the eye external to a corneal limbus boundary of the eye. The operations may further include applying several distinct filters to each of the image regions to generate a plurality of respective descriptors for the region. The several distinct filters may include a plurality of convolutional filters that are each configured to describe one or more aspects of an eye vasculature and in combination describe a visible eye vasculature in a feature space. The operations may further include determining a match score based on the generated descriptors and based on one or more descriptors associated with a second image of eye vasculature.

These and other embodiments can each optionally include one or more of the following features. The visible eye vasculature may be described by some of the generated descriptors that are based on co-occurrence statistics of image data elements in one or more of the image regions. The visible eye vasculature may be described by some of the generated descriptors that are based on information-theoretic statistics of image data elements in one or more of the image regions. The visible eye vasculature may be described locally and globally by some of the generated descriptors that are based on one or more non-convolutional statistical derivatives of image data elements. One of the convolutional filters may be a Gabor filter. One of the convolutional filters may be a wavelet transform. One of the several filters may be a non-linear filter. The non-linear filter may be a trained neural network. Applying the several distinct filters to each of the image regions to generate a plurality of respective descriptors for the region, may include combining respective outputs of one or more of the filters. Applying the several distinct filters to each of the image regions to generate a plurality of respective descriptors for the region, may include calculating respective magnitudes of outputs of one or more of the filters. Determining a match score may include combining the respective descriptors for each of the regions into a respective vector for the region: for one or more of the regions of the first image, comparing the respective vector for the region to a vector derived from descriptors for a corresponding region of the second image to generate a respective similarity score; and determining the match score based on, at least, the generated similarity scores. It may be determined whether the match score exceeds a value, wherein the value is based on, at least, a robust threshold in a neighborhood of a three-dimensional receiver operating curve generated from a sensitivity analysis. The image data element may be one of a voxel, a pixel, a ray, or a red, green or blue channel value. An image region may include one or more contiguous or non-contiguous image data elements. Obtaining the one or more image regions may include tiling a region to obtain smaller regions.

Particular embodiments of the invention can be implemented to realize none, one or more of the following advantages. Some implementations may provide security by reliably authenticating individuals. Some implementations may reduce noise sensitivity of an authentication system compared to minutiae detection based systems. Some implementations may facilitate efficient storage and retrieval of enrollment profiles used for authentication.

The details of one or more embodiments of the invention are set forth in the accompanying drawings and the description below. Other features, aspects, and advantages of the invention will become apparent from the description, the drawings, and the claims.

DETAILED DESCRIPTION

Distinctive features of an individual's visible vasculature in the whites of the eyes may be used to identify or authenticate the individual. For example, images of the white of a user's eye can be obtained and analyzed to compare features of the eye to reference record in order to authenticate the user and grant or deny the user access to a resource.

The unique structure of an individual's visible vasculature may be reflected in texture features of images of the white of the individual's eye. Images may be segmented to identify regions on the white of the eye (e.g., a set of small tiles arranged in a grid to cover an area left or right of the iris) for texture analysis. A set of filters may be applied to determine descriptors of the texture features of the individual vasculature in these small regions. For example, some of the applied filters may be convolutional filters that form a basis for a feature space that can be used to describe significant textural features of an individual's vasculature. A vector of descriptors derived from filter outputs may be assembled into a descriptor vector.

During an authentication or identification operation, the descriptor vector determined for a user may be compared to a corresponding descriptor vector from reference record for and enrolled individual. The descriptor vectors may be compared by determining a match score that reflects the likelihood of match between the user and the enrolled individual. For example, the match score may be determined as a distance between the two descriptor vectors. In some implementations, the match score is determined as the output of a trained function approximator (e.g., a neural network) in response to passing in the two descriptor vectors as inputs. The match score may be compared to one or more thresholds to determine whether to accept or reject the user.

Figure 1:
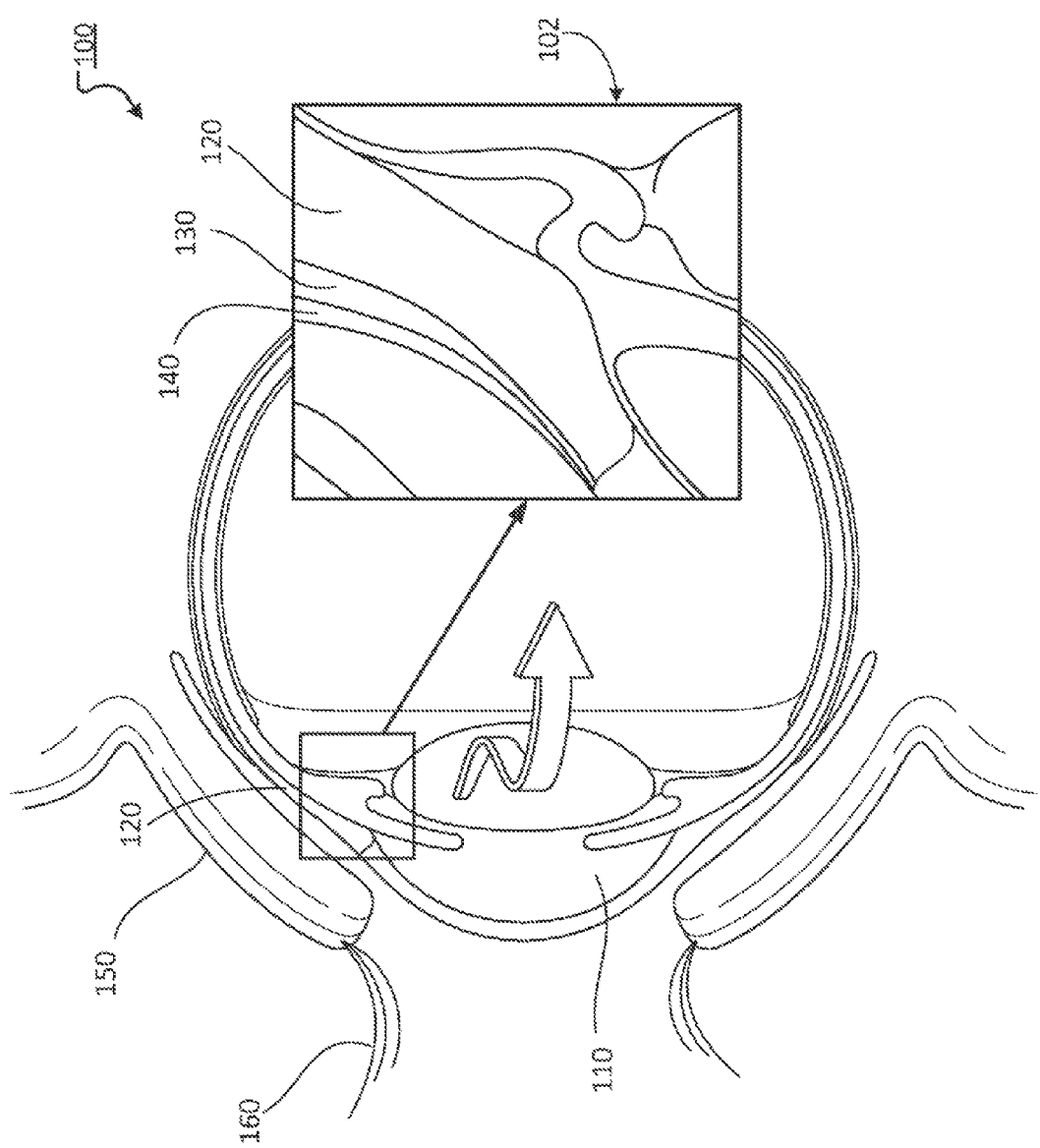
FIG. 1 is a diagram of the anatomy of a human eye.

FIG. 1 is a diagram of the anatomy of a human eye 100. The diagram is a cross-section of the eye with a blowup 102 of the anatomy near the corneal limbus boundary of the eye that separates the colored iris 110 from the surrounding white of the eye. The white of the eye includes a complex vascular structure which is not only readily visible and scannable from outside of the eye, but in addition that vascular structure is unique and varies between individuals. Thus, these vascular structures of the white of the eye, mostly due to vasculature of conjunctiva and episclera, can be scanned and advantageously used as a biometric. This biometric can be used to authenticate a particular individual, or, identify an unknown individual.

The white of the eye has a number of layers. The sclera 120 is an opaque, fibrous, protective, layer of the eye containing collagen and elastic fiber. The sclera 120 is covered by the episclera 130, which has a particularly large number of blood vessels and veins that that run through and over it. The episclera 130 is covered by the bulbar conjunctiva 140, which is a thin clear membrane that interfaces with the eyelid 150 or the environment when the eyelid is opened. Blood vessels and veins run through all of these layers of the white of the eye and can be detected in images of the eye. The eye also includes eyelashes 160 that may sometimes obscure portions of the white of the eye in an image.

Figure 2:
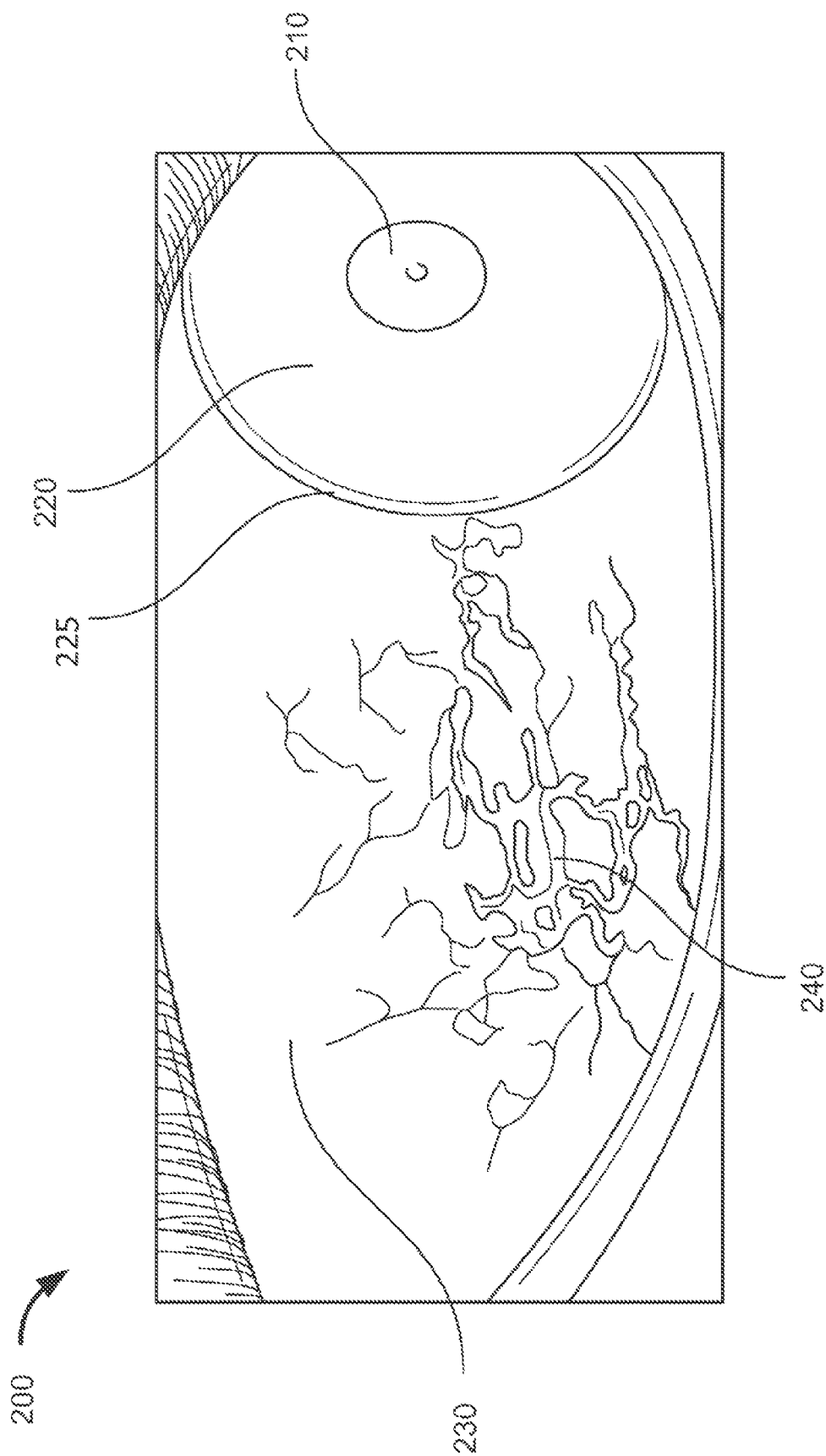
FIG. 2 is a diagram of an example image including portions showing vasculature of the white of an eye.

FIG. 2 is a diagram of an example image 200 including portions showing vasculature of the white of an eye. Such an image 200 may be captured with a sensor (e.g., a camera) that is integrated into a computing device such as, for example, a smart phone, a tablet computer, a television, a laptop computer, or a personal computer. For example, a user may be prompted through a display or audio prompt to look to the left while the image is captured, thus exposing a larger area of the white of the eye to the right of the iris to the view of the sensor. Similarly, a user may be prompted to look right, up, down, straight, etc. while an image is captured. The example image includes a view of an iris 220 with a pupil 210 at its center. The iris 220 extends to the corneal limbus boundary 225 of the eye. The white 230 of the eye is external to a corneal limbus boundary 225 of the eye. An extensive vasculature 240 of the white of the eye is visible in the image 100. This vasculature 240 may be distinctive for an individual. In some implementations, distinctive features of the vasculature 240 may be used as a basis for identifying, verifying, or authenticating an individual user.

Figure 3:
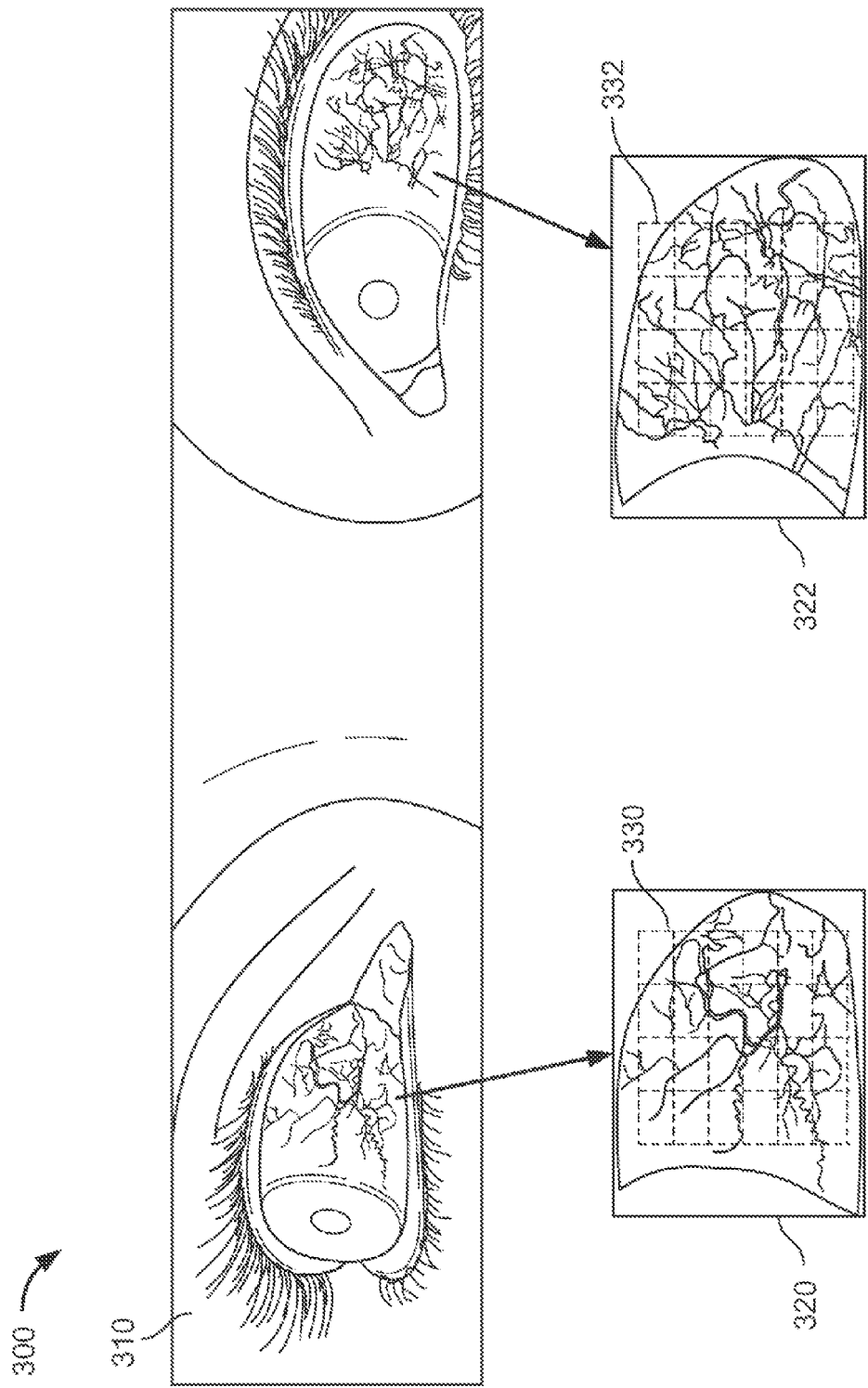
FIG. 3 is a diagram of an example image that is segmented for analysis.

FIG. 3 is a diagram of an example image 300, including portions showing vasculature of the whites of two eyes, that is segmented for analysis. A captured image 310 may be obtained in a variety of ways. The captured image 310 may be preprocessed and segmented to isolate regions of interest within the image and enhance the view of vasculature in the whites of the eyes. For example, the regions of interest may be tiled portions that form grids covering some or all the whites of the eyes. A portion 320 of the corresponding to the white of the right eye left of the iris may be isolated, for example, by identifying the corneal limbus boundary and the edges of the eyelids. Similarly, a portion 322 corresponding to the white of the left eye left of the iris may be isolated. Preprocessing may be used to enhance the view of the vasculature in this region, for example, by selecting a component color from the image data that maximizes the contrast between the vasculature and the surrounding white portions of the whites of the eyes. In some implementations, these portions 320, 322 of the image may be further segmented into tiles forming grids 330, 332 that divide an exposed surface area of the whites of the eyes into smaller regions for analysis purposes. Features of the vasculature in these regions of interest may be used for identification or authentication of an individual.

Figure 4:
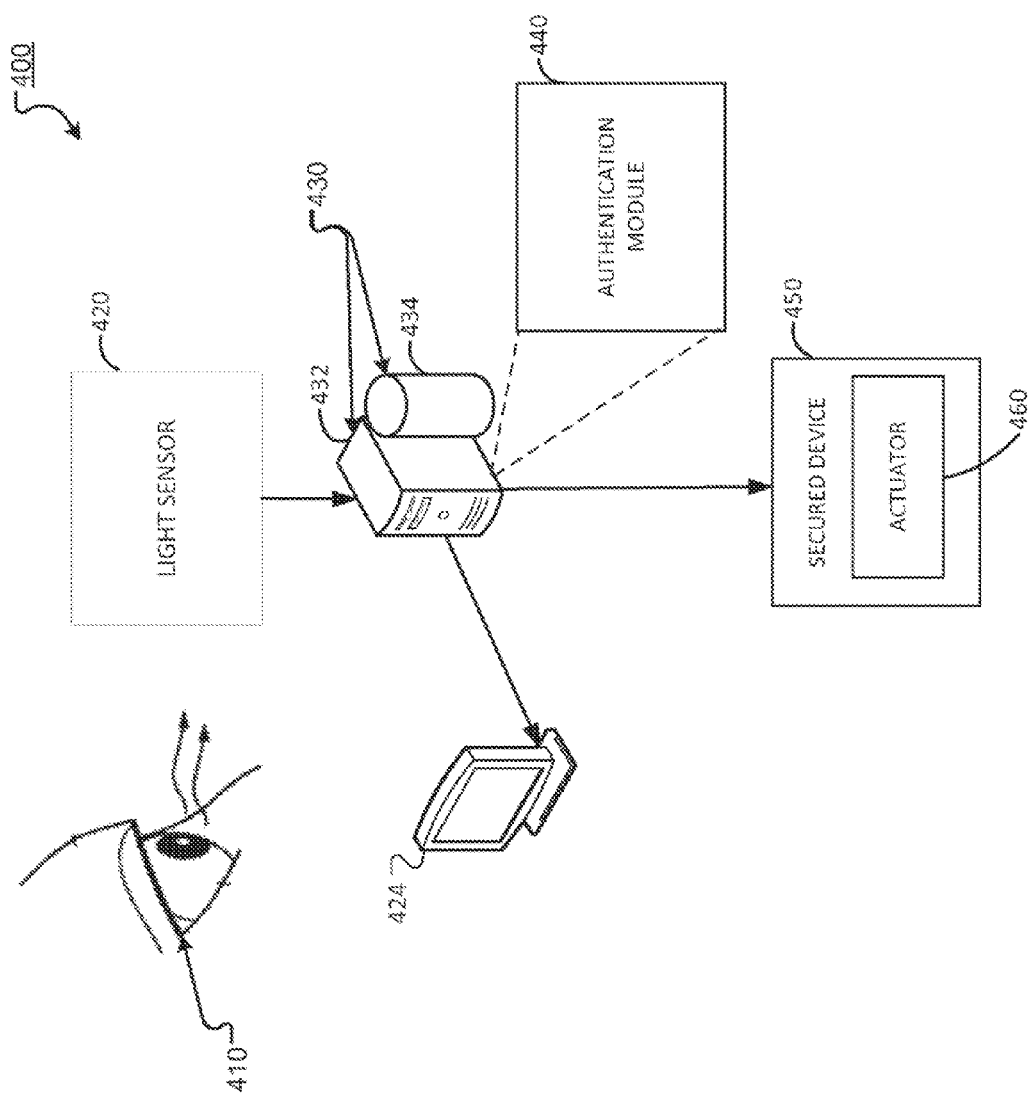
FIG. 4 is a block diagram of example security system that is configured to authenticate an individual based in part on one or more images of the white of an eye.

FIG. 4 is a block diagram of example security system 400 that is configured to authenticate an individual based in part on one or more images of the white of an eye 410. A user of the security system 400 may present their eye 410 to a light sensor 420. In this manner one or more images of the white of the eye 410 may be captured. A digital camera, a three-dimensional (3D) camera, and a light field sensor are examples of light sensors that may be employed. The light sensor 420 may employ a variety of technologies, e.g., digital charge-coupled devices (CCD) or complementary metal-oxide-semiconductors (CMOS). In some implementations, the user may be prompted via messages shown on display 424 to make certain poses to expose portions of the white of the eye 410 and facilitate image acquisition. For example, the user may be prompted to direct their gaze in order to roll the iris of their eye 410 left, right, up, up-left, and roll up-right. In some implementations, not shown, the user may be prompted to assume poses through messages played through a speaker, through indicator lights (e.g. LEDs), or not prompted at all.

In some implementations, the sensor 420 can be configured to detect when the eye 410 has been properly positioned in the field of view of the sensor. Alternatively, software or firmware implemented on a computing device 430 can analyze one or more images produced by the light sensor 420 to determine whether the eye 410 has been properly positioned. In some implementations, the user may manually indicate when the eye 410 is properly positioned through a user interface (e.g., button, keyboard, keypad, touchpad, or touch screen).

An authentication module 440 implemented on the computing device 430 may obtain one or more images of the white of the eye through the light sensor 420. In some implementations, the computing device 430 is integrated with or electrically coupled to the light sensor 420. In some implementations, the computing device 430 may communicate with the light sensor 420 through a wireless interface (e.g., an antenna).

The authentication module 440 processes images obtained through the light sensor 420 to control access to a secured device 450. For example, the authentication module 440 may implement authentication processes described in relation to FIG. 6. In some implementations, the secured device 450 may include an actuator 460 (e.g., a locking mechanism) that affects the access control instructions from the authentication module 440.

The computing device may be integrated with or interface with the secured device 450 in a variety of ways. For example, the secured device 450 may be an automobile, the light sensor 420 may be a camera integrated in the steering wheel or dashboard of the automobile, and the computing device 430 may be integrated in the automobile and electrically connected to the camera and an ignition locking system that serves as the security actuator 460. A user may present views of the whites of their eye to the camera in order to be authenticated as an authorized driver of the automobile and start the engine.

In some implementations, the secured device 450 may be a real estate lock box, the light sensor 420 may be a camera integrated with the user's mobile device (e.g., a smartphone or tablet device), and the processing of the authentication module 440 may be performed in part by the user's mobile device and in part by a computing device integrated with the lock box that controls a power locking mechanism. The two computing devices may communicate through a wireless interface. For example, the user (e.g., a realtor giving a showing of a property) may use the camera on their mobile device to obtain one or more images and submit data based on the images to the lock box in order to be authenticated as authorized user and granted access to keys stored in the lock box.

In some implementations, the secured device 450 is a gate or door that controls access to a property. The light sensor 420 may be integrated in the door or gate or positioned on a wall or fence near the door or gate. The computing device 430 may be positioned nearby and may communicate through a wireless interface with the light sensor 420 and a power locking mechanism in the door or gate that serves as an actuator 460. In some implementations, the secured device 450 may be a rifle and the light sensor 420 may be integrated with a scope attached to the rifle. The computing device 430 may be integrated in the butt of the rifle and may electronically connect to the light sensor 420 and a trigger or hammer locking mechanism that serves as an actuator 460. In some implementations, the secured device 450 may be a piece of rental equipment (e.g., a bicycle).

The computing device 430 may include a processing device 432 (e.g., as described in relation to FIG. 9) and a machine-readable repository, or database 434. In some implementations, the machine-readable repository may include flash memory. The machine-readable repository 434 may be used to store one or more reference records. A reference record may include data derived from one or more images of the white of an eye for a registered our authorized user of the secured device 450. In some implementations, the reference record includes complete reference images. In some implementations, the reference record includes features extracted from the reference images. In some implementations, the reference record includes encrypted features extracted from the reference images. In some implementations, the reference record includes identification keys encrypted by features extracted from the reference images. To create a reference record for a new user and enrollment or registration process may be carried out. An enrollment process may include the capture of one or more reference images of the white of a new registered user's eye. In some implementations, the enrollment process may be performed using the light sensor 420 and processing device 430 of authentication system 400.

Figure 5:
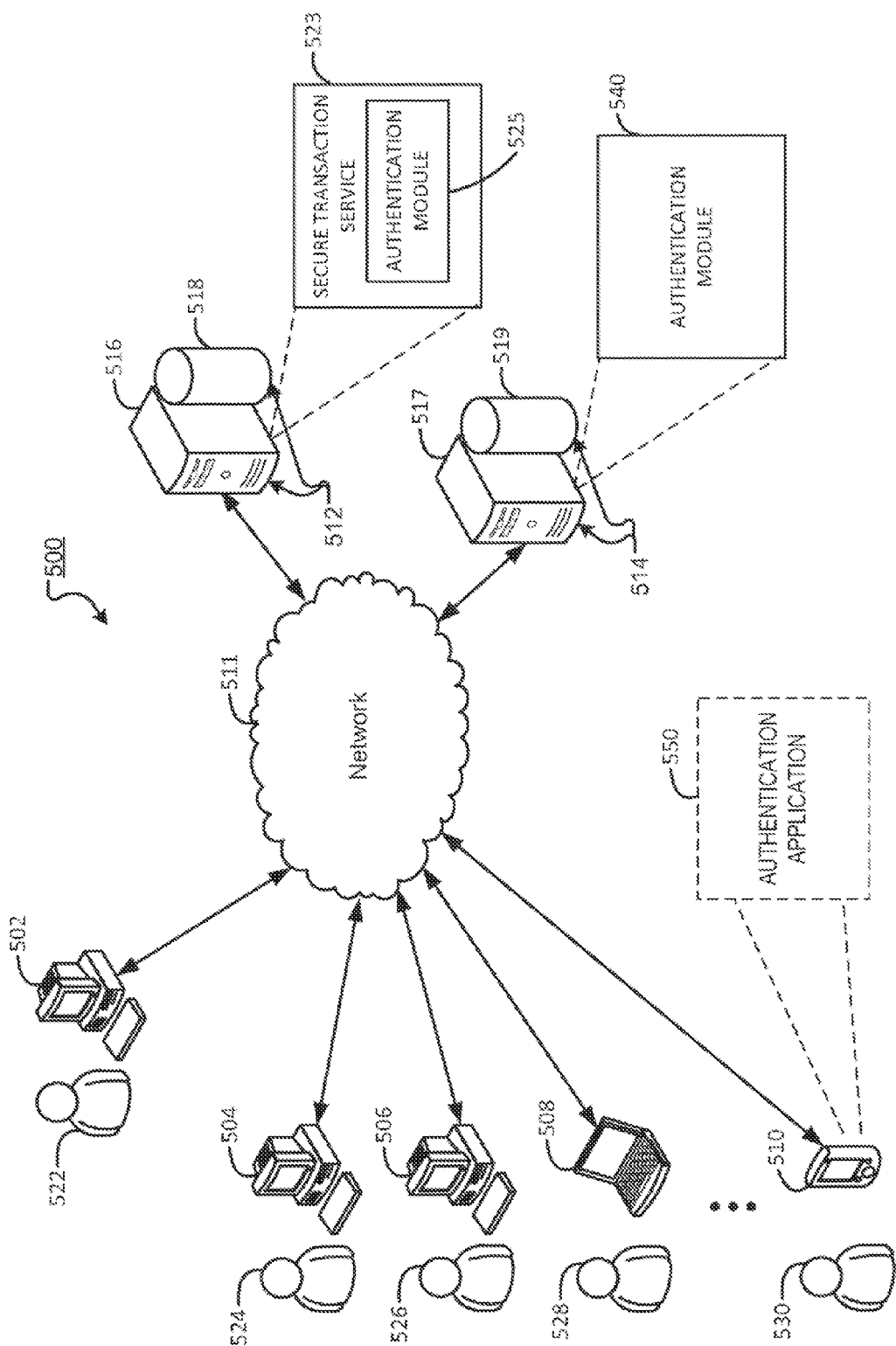
FIG. 5 is a block diagram of an example online environment.

FIG. 5 is a block diagram showing an example of a network environment 500 on which the techniques described herein may be implemented. Network environment 500 includes computing devices 502, 504, 506, 508, 510 that are configured to communicate with a first server system 512 and/or a second server system 514 over a network 511. Computing devices 502, 504, 506, 508, 510 have respective users 522, 524, 526, 528, 530 associated therewith. The first and second server systems 512, 514 each include a computing device 516, 517 and a machine-readable repository, or database 518, 519. Example environment 500 may include many thousands of Web sites, computing devices and servers, which are not shown.

Network 511 may include a large computer network, examples of which include a local area network (LAN), wide area network (WAN), the Internet, a cellular network, or a combination thereof connecting a number of mobile computing devices, fixed computing devices, and server systems. The network(s) included in network 511 may provide for communications under various modes or protocols, examples of which include Transmission Control Protocol/internet Protocol (TCP/IP), Global System for Mobile communication (GSM) voice calls, Short Electronic message Service (SMS), Enhanced Messaging Service (EMS), or Multimedia Messaging Service (MMS) messaging, Ethernet, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. Communication may occur through a radio-frequency transceiver. In addition, short-range communication may occur, e.g., using a BLUETOOTH, WiFi, or other such transceiver system.

Computing devices 502, 504, 506, 508, 510 enable respective users 522, 524, 526, 528, 530 to access and to view documents, e.g., web pages included in web sites. For example, user 522 of computing device 502 may view a web page using a web browser. The web page may be provided to computing device 502 by server system 512, server system 514 or another server system (not shown).

In example environment 500, computing devices 502, 504, 506 are illustrated as desktop-type computing devices, computing device 508 is illustrated as a laptop-type computing device 508, and computing device 510 is illustrated as a mobile computing device. It is noted, however, that computing devices 502, 504, 506, 508, 510 may include, e.g., a desktop computer, a laptop computer, a handheld computer, a television with one or more processors embedded therein and/or coupled thereto, a tablet computing device, a personal digital assistant (PDA), a cellular telephone, a network appliance, a camera, a smart phone, an enhanced general packet radio service (EGPRS) mobile phone, a media player, a navigation device, an electronic messaging device, a game console, or a combination of two or more of these data processing devices or other appropriate data processing devices. In some implementations, a computing device may be included as part of a motor vehicle (e.g., an automobile, an emergency vehicle (e.g., fire truck, ambulance), a bus).

Users interacting with computing devices 502, 504, 506, 508, 510 can interact with a secure transaction service 523 hosted, e.g., by the server system 512, by authenticating themselves and issuing instructions or orders through the network 511. The secure transactions may include, e.g., e-commerce purchases, financial transactions (e.g., online banking transactions, credit or bank card transactions, loyalty reward points redemptions), or online voting. The secured transaction service may include an authentication module 525 that coordinates authentication of users from the secured server's side of the interaction. In some implementations, authentication module 525 may receive image data from a user device (e.g., computing devices 502, 504, 506, 508, 510) that includes one or more images of the eye of a user (e.g., users 522, 524, 526, 528, 530). The authentication module may then process the image data to authenticate the user by determining if the image data matches a reference record for a recognized user identity that has been previously created based on image data collected during an enrollment session.

In some implementations, a user who has submitted a request for service may be redirected to an authentication module 540 that runs on separate server system 514. Authentication module 540 may maintain reference records for registered or enrolled users of the secure transaction service 523 and may also include reference records for users of other secure transaction services. Authentication module 540 can establish secure sessions with various secure transaction services (e.g., secure transaction service 523) using encrypted network communications (e.g., using a public key encryption protocol) to indicate to the secure transaction service whether the user has been authenticated as a registered or enrolled user. Much like authentication module 525, authentication module 540 may receive image data from the requesting user's computing device (e.g., computing devices 502, 504, 506, 508, 510) and may process the image data to authenticate the user. In some implementations, the authentication module may determine texture features for images received from a user and may accept or reject the images based on the texture features.

Figure 9:
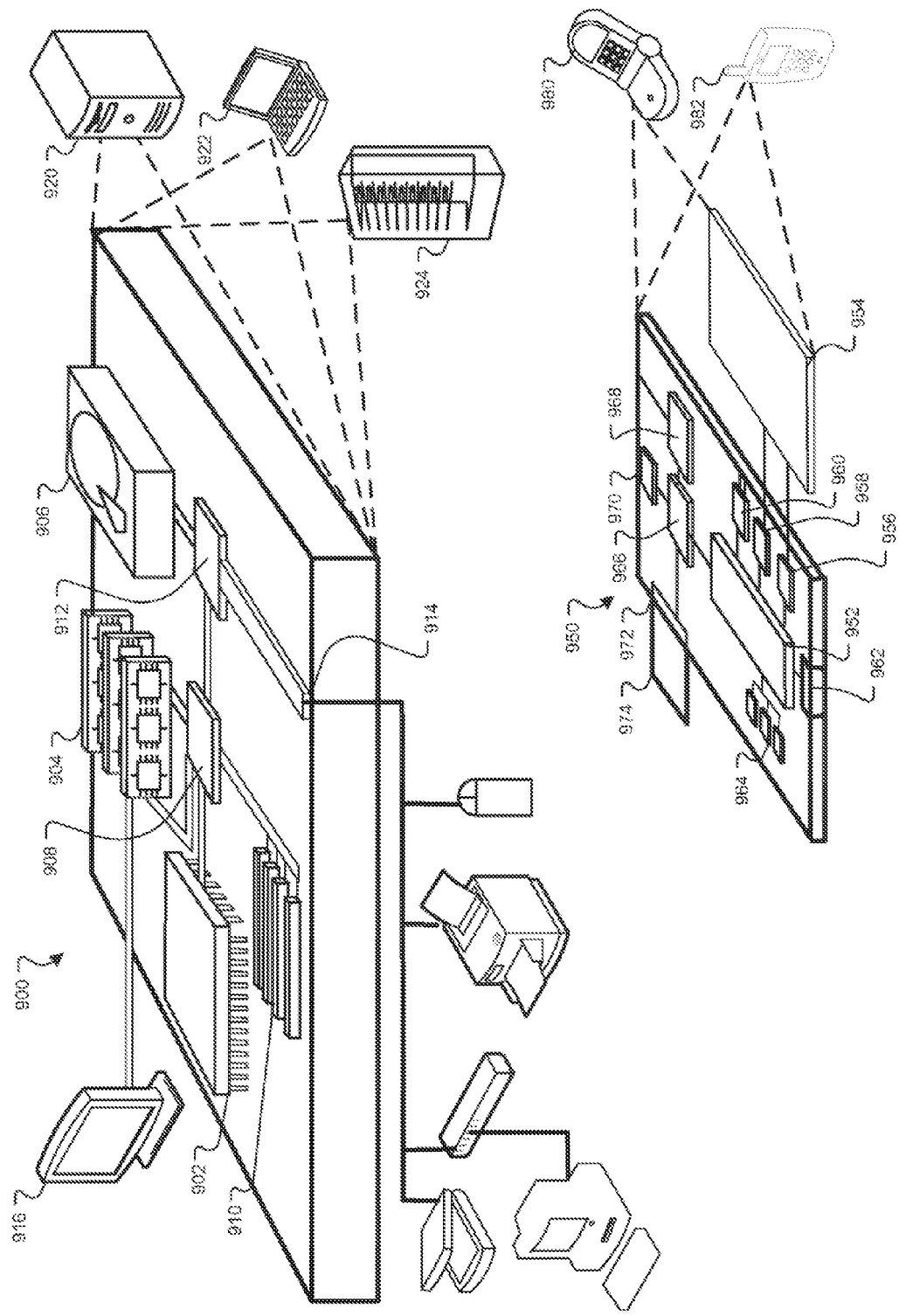
FIG. 9 shows an example of a computer device and a mobile computer device that can be used to implement the techniques described here.

The authentication module 540 may be implemented as software, hardware or a combination of software and hardware that is executed on a processing apparatus, such as one or more computing devices (e.g., a computer system as illustrated in FIG. 9).

A user device (e.g., computing device 510) may include an authentication application 550. The authentication application 550 may facilitate the authentication of the user as a registered or enrolled user identity for the purpose of accessing secured services (e.g., secure transaction service 523) through a network 511. For example, the authentication application 550 may be a mobile application or another type client application for interacting with a server-side authentication module (e.g., authentication module 540). The authentication application 550 may drive a sensor (e.g., a camera connected to or integrated with a user computing device) to capture one or more images of a user (e.g., user 530) that include views of the white of the user's eye. The authentication application 550 may prompt (e.g., through a display or speakers) the user to pose for image capture. For example, the user may be prompted to face the sensor and direct their gaze left or right to expose large portions of the white of an eye to the sensor.

In some implementations, the authentication application 550 transmits captured image data to an authentication module (e.g., authentication modules 525 or 540) on a remote server (e.g., server systems 512 or 514) through the network 511. The collection of image data from user may facilitate enrollment and the creation of a reference record for the user. The collection of image data from user may also facilitate authentication against a reference record for a user identity.

In some implementations, additional processing of the image data for authentication purposes may be performed by the authentication application 550 and the results of that processing may be transmitted to an authentication module (e.g., authentication modules 525 or 540). In this manner, the authentication functions may be distributed between the client and the server side processes in a manner suited a particular application. For example, in some implementations, the authentication application 550 determines texture features for captured images and rejects any images. The texture features may be transmitted to a server side authentication module (e.g., authentication modules 525 or 540) for further analysis.

In some implementations, the authentication application accesses a reference record for a user identity and conducts a full authentication process, before reporting the result (e.g., user accepted or rejected) to a server side authentication module.

The authentication application 550 may be implemented as software, hardware or a combination of software and hardware that is executed on a processing apparatus, such as one or more computing devices (e.g., a computer system as illustrated in FIG. 9).

Figure 6:
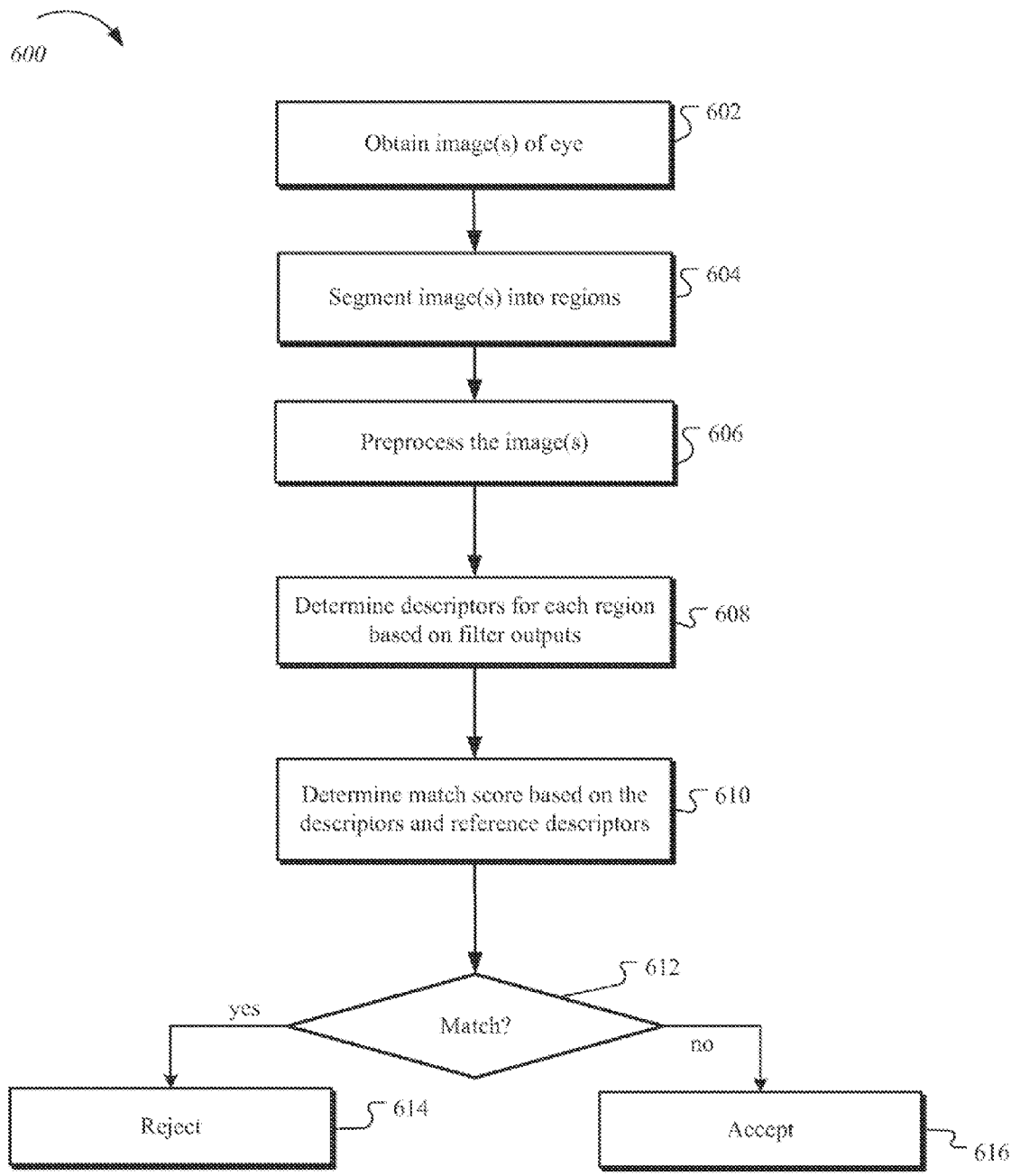
FIG. 6 is a flow chart of an example process for authenticating an individual based on one or more images of the white of an eye.

FIG. 6 is a flow chart of an example process 600 for authenticating an individual based on one or more images of the white of an eye. Texture features or descriptors are determined for the obtained images by applying a set of filters to the images. A match score is determined that compares the determined features to a reference record. The individual is then accepted or rejected based on the match score.

The process 600 can be implemented, for example, by the authentication module 440 in the computing device 430 of FIG. 4. In some implementations, the computing device 430 is a data processing apparatus that includes one or more processors that are configured to perform actions of the process 600. For example, the data processing apparatus may be a computing device (e.g., as illustrated in FIG. 9). In some implementations, process 600 may be implemented in whole or in part by the authentication application 550 that is executed by a user computing device (e.g., computing device 510). For example, the user computing device may be a mobile computing device (e.g. mobile computing device 950 of FIG. 9). In some implementations, process 600 may be implemented in whole or in part by the authentication module 540 that is executed by a user server system (e.g., server system 514). In some implementations, the server system 514 is a data processing apparatus that includes one or more processors that are configured to perform actions of the process 600. For example, the data processing apparatus may be a computing device (e.g., as illustrated in FIG. 9). In some implementations, a computer readable medium can include instructions that when executed by a computing device (e.g., a computer system) cause the device to perform actions of the process 600.

One or more images of an eye are obtained 602. The images include a view of a portion of a vasculature of the eye external to a corneal limbus boundary of the eye. The obtained images may be monochrome or represented in various color spaces (e.g., RGB, SRGB, HSV, HSL, or YCbCr). In some implementations, an image may be obtained using a is light sensor (e.g., a digital camera, a 3D camera, or a light field sensor). The sensor may be sensitive to light in various ranges of wavelength. For example, the sensor may be sensitive to the visible spectrum of light. In some implementations, the sensor is paired with a flash or torch that can be pulsed to illuminate objects in view of the sensor. The capture of images can be synchronized or time-locked with pulsing of a flash. In some implementations, the sensor captures a sequence of images that can be used to track motion of objects within the field of view of the sensor. The sensor can include one more settings that control image capture (e.g., focus distance, flash intensity, exposure, and white balance). The images can collectively include a plurality of focus distances. For example, a sequence of images may be captured, each image captured with a different focus distance settings for the sensor and/or some sensors (e.g., a light field sensor) can capture an image that is focused at a plurality of distances from the sensor. In some implementations, the one or more images can be obtained 502 by reception through a network interface (e.g., a network interface of server system 514).

The one or more images may be segmented 604 to identify regions of interest that include the best views of vasculature in the white of an eye. In some implementations, anatomical landmarks (e.g., an iris, its center and corneal limbus boundary, eye corners, and the edges of eyelids) may be identified in the one or more images. Regions of interest within the image may be identified and selected based on their location in relation to the identified anatomical landmarks. For example, regions of interest may be located in the white of eye to the left, right, above, or below the iris. In some implementations, the selected regions of interest are tiled to form a grid covering a larger portion of the white of the eye. Tiles may be registered (i.e. their locations will be aligned) with respect to the iris center and iris boundary so the same tile locations can be compared across images. In some implementations, the selected regions of the image are noncontiguous (e.g. neighboring regions may overlap or neighboring regions may have space between them). The selected regions of interest may correspond to regions of interest selected from a reference image on which data in a reference record is based.

In some implementations, eye corners are found by fitting curves on the detected portions of the eyelid over sclera, and then extrapolating and finding the intersection of those curves. If one intersection (corner) cannot be found due to the fact that the iris was too close (e.g., due to gaze direction), then a template from the same corner area but from the opposite gaze direction photo can be derived and applied to the problematic corner neighborhood in the image at hand, and the maximum correlation location can be tagged as the corner.

In some implementations, eyelids are found by adaptive thresholding methods that find the white of the eye from the image, which border the eyelids. The sclera mask itself can be corrected by morphological operations (e.g., convex hull) to take out aberrations.

In some implementations, the limbic boundary is found from the sclera mask as where the sclera ends due to its termination at the iris limbic boundary.

In some implementations, the iris center is found through multiple methods. If the eye color is light, the center of the pupil can be found as the iris center. If the iris is too dark, then the center of the ellipsoid fitted to the limbic boundary and its center is found, or it is determined as the focal point of normal rays (i.e., lines perpendicular to tangents to the limbic boundary) converging around the iris center, or a combination of the above methods.

The image regions may be preprocessed 606 to enhance the view of a vasculature within an image. In some implementations, preprocessing 606 includes color image enhancement and Contrast Limited Adaptive Histogram Equalization (CLAHE) which enhances the contrast of the intensity image. CLAHE operates in small regions of the image called tiles. Each tile's contrast is enhanced such that the histogram of the output approximately matches the histogram specified by particular distribution (e.g., uniform, exponential, or Rayleigh distribution). The neighboring tiles are then combined using bilinear interpolation to eliminate the artificially induced boundaries. In some implementations, the images may be enhanced by selecting one of the red, green or blue color components which has the best contrast between the vessels and the background. The green component may be preferred because it may provide the best contrast between vessels and background.

In some implementations, preprocessing 606 includes application of a multi-scale enhancement filtering scheme to enhance the intensity of the images thereby facilitating detection and subsequent extraction features of the vascular structure. The parameters of the filter may be determined empirically so as to account for variations in the girth of the blood vessels. The algorithm used may have good sensitivity, good specificity for curves and suppresses objects of other shapes. The algorithm may be based on the second derivatives of the image. First, since the second derivatives are sensitive to noise, an image segment is convolved with a Gaussian function. The parameter a of the Gaussian function may correspond to the thickness of a blood vessel. Next, for each image data element, a Hessian matrix may be built and eigenvalues λ1 and λ2 may be computed. In each Hessian matrix ridges are defined as points where the image has an extremum in the direction of the curvature. The direction of the curvature is the eigenvector of the second order derivatives of the image that corresponds to the largest absolute eigenvalue λ. The sign of the eigenvalue determines if it is a local minimum λ>0 or maximum λ<0. The computed eigenvalues are then used to filter the blood vessel line with the equations:

$$I\_line(\lambda 1, \lambda 2) = |\lambda 1| - |\lambda 2| \text{ if } \lambda 1 < 0 \text{ and } I\_line(\lambda 1, \lambda 2) = 0$$
$$\text{If } \lambda 1 \geq 0$$

The diameter of the blood vessels varies but the algorithm assumes the diameter is within an interval, [d0, d1]. Gaussian smoothing filters may be employed in the scale range of [d0/4, d1/4]. This filtering may be repeated N times based on the smoothing scales:

$$\sigma 1 = d0/4, \sigma 2 = r^*\sigma 1, \sigma 2 = r^{\wedge}2^*\sigma 1, \ldots \sigma 2 = r^{\wedge}(N-1)^*\sigma 1 = d1/4$$

This final output may be the maximum value from the output of all individual filters of N scales.

Descriptors may be determined 608 in part by applying a set of filters to the image regions that correspond to texture features of those image regions. Several distinct filters may be applied to each of the image regions to generate a plurality of respective descriptors for the region. The distinct filters may include a set of convolutional filters that are each configured to describe one or more aspects of an eye vasculature. The set of convolution filters in combination may describe a visible eye vasculature in a feature space. The distinct filters may include filters that extract pixel statistics (e.g., mean, median, standard deviation, and entropy) for the image regions.

In some implementations, descriptors may be determined 608 in part by applying a set of complex Gabor filters at various angles to the image. The parameters of the filter can be determined empirically (e.g., using an independent components analysis of a corpus of eye vasculature images) so as to account for variations in the spacing, orientation, and girth of the blood vessels. The phase of Gabor filtered image, when binarized using a threshold, may facilitate detection and reveal sharp visible vasculature.

The phase of complex Gabor filtered image reflects the vascular patterns at different angles. The phase of the Gabor-filtered images may vary from $-\pi$ to $+\pi$ radians. Phase values above 0.25 and below −0.25 radians may correspond to vascular structures. To binarize the phase image using thresholding, all values of phase above 0.25 or below −0.25 may be set to one and the remaining values to zero. This may result in a sharp (i.e., well defined or high contrast) vasculature structure in corresponding phase image. This operation can be performed for images resulting from applications of multiple Gabor kernels at different angles. All the resulting binarized images may be added, to reveal a fine and crisp vascular structure. In some implementations, a vector of the elements of the binarized phase images may be used as a descriptor vector for comparing the image to a reference record. In some implementations, differences in descriptors reflecting textural features between image regions of interest may be used as a descriptor vector. The sum of all the 1's in a binarized image area divided by the area of region of interest may reflect the extent of the visible vasculature.

In some implementations, other convolutional filters may be applied to the images to determine 608 descriptors of the texture for regions (e.g., tiles) in the images. For example, a wavelet transform or Fourier transform may be applied to regions in the images. Other convolutional filters are possible. In some implementations, determining 608 the descriptors may include determining magnitudes or phases of complex filter outputs for a region of an image.

In some implementations, the visible eye vasculature is described by some of determined 608 descriptors that are based on co-occurrence statistics of image data elements in one or more of the image regions. For example, a Grey-Level Co-occurrence Matrix (GLCM) may be determined for each of one or more of the regions (e.g., tiles) identified by segmentation of the image. A GLCM may be determined for a color component (e.g., green, blue, or luminance) of a region in one of the images. Various statistics (e.g., contrast, correlation, energy, or homogeneity) may be derived from the GLCM.

In some implementations, using a dataset of different subjects' eyes, a large set of various GLCM statistical descriptors are produced. For each region of interest, GLCM matrices at different gray levels, orientations, offsets, tile sizes, and image scales are produced. For each combination, the aforesaid four statistics of GLCM (energy, contrast, correlation, and homogeneity) may be calculated for each tile and at different angles, and the results may be concatenated into descriptor vectors (e.g. four GLCM statistics of each tile at different set of angles (e.g., 0°, 30°, 60°, 90°, 120°, and 150°) are produced and concatenated. This descriptor vector extraction process can be repeated for different gray levels, offsets, tile sizes, and image scales. Descriptor vectors for true matches and non-matches (regions of interest from the same eye vs. different eyes) are compared using a similarity metric (e.g., correlation or mean squared error). The ROC curves for each combination (descriptor vectors at different image scale, offset, gray level, and tile size used in comparing genuine and impostor match scores) are produced and the best characteristics (e.g., those with highest area under ROC curve) are set aside. If there are multiple good descriptor sets at different configurations, their resulting match scores can be fused using a weighted sum rule.

In some implementation, the visible eye vasculature is described by some of the determined 608 descriptors that are based on information-theoretic statistics (e.g., entropy, self-similarity, fractal dimension) of image data elements in one or more of the image regions. For example, the entropy for a region (e.g., a tile) of an image may be determined by generating a histogram of the image data element values within the region and calculating the entropy for this distribution as:

$$\Sigma i |-i^* \ln(h(i))|$$

Where i an index that takes on the possible image data element levels, h(i) is a count of the image data elements in the bin of the histogram for that i level, ln( ) is a natural logarithm. In some implementations, a fractal dimension for the vasculature in a region may be determined using a box counting algorithm. For example, after applying a set of Gabor filters and thresholding the resulting phase images to generate a binarized image of the vasculature in the region, box counting analysis can be applied to the binarized image to determine the fractal dimension of the vasculature.

In some implementations, the visible eye vasculature is described locally and globally by some of the determined 608 descriptors that are based on one or more non-convolutional statistical derivatives of image data elements. Eye vasculature is described locally by determining statistics for data image elements in a small region (e.g., a tile) of an image. Eye vasculature is described globally by determining statistics for data image elements in a larger region of interest (e.g., an area left of the iris or right of the iris) or an entire image. For example, the mean or variance of image data element values in a region or image may be determined 608.

In some implementations, descriptors are determined 608 by applying a non-linear filter. For example a trained neural network or other non-linear function approximator may be applied to the images or regions (e.g., tiles) of the images.

In some implementations, several distinct filters are applied to each of the image regions (e.g., tiles) and the outputs of these filters are combined to generate a plurality of descriptors for the region. For example, the outputs (e.g., the square of the magnitude of each image data element of the output) of multiple Gabor filters applied to a region may be added together to reveal crisp images of vasculature features of the white of an eye and statistics may be determined for this combined output signal for the region.

In some implementations, the descriptors are determined 608 based on the outputs of a cascade of filter banks that are conditionally applied to the obtained images. Some examples of such a process are described in relation to FIG. 7 and FIGS. 8A-8B.

For example, the descriptors can be determined 608 by the authentication module 440, the authentication application 550, authentication module 525, or the authentication module 540.

A match score is determined 610 based on the features and corresponding features from a reference record. The reference record may include data based at least in part on one or more reference images captured during an enrollment or registration process for a user. In some implementations, a match score may be determined 610 as a distance (e.g. a Euclidian distance, a correlation coefficient, modified Hausdorff distance, Mahalanobis distance. Bregman divergence, cosine similarity, Kullback-Leibler distance, and Jensen-Shannon divergence) between a vector of features extracted from the one or more obtained images and a vector of features from the reference record. In some implementations, the match score may be determined 610 by inputting features extracted from the one or more obtained images and features from the reference record to a trained function approximator.

The function approximator models the mapping from input data (i.e., the training is image data) to output data (i.e., the resulting match score) with a set of model parameters. The model parameter values are selected using a training algorithm that is applied to the training data. For example, the function approximator can be based the following models: linear regression, Volterra series, Wiener series, radial basis functions, kernel methods, polynomial methods; piecewise linear models, neural networks, support vector machines, or fuzzy function approximator. Other models are possible.

In some implementations, determining 610 a match score may include combining the respective descriptors for each of the regions (e.g., tiles) into a respective vector for the region and comparing the respective vector for the region to a vector derived from descriptors for a corresponding region of an image from a reference record to generate a similarity score for the region. The match score may be determined in part based on similarity scores for one or more the regions analyzed.

In some implementations, a quality based fusion match score is determined 610 based on match scores for multiple images of the same vasculature. In some implementations, match scores for multiple images are combined by adding the match scores together in weighted linear combination with weights that respectively depended on quality scores determined for each of the multiple images. Other examples of techniques that may be used to combine match scores for multiple images based on their respective quality scores include hierarchical mixtures, sum rule, product rule, gated fusion, Dempster-Shafer combination, and stacked generalization, among others.

In some implementations, the match score is determined 610 by an authentication module (e.g., authentication module 440 running on computing device 430).

The match score may be checked 612 to determine whether there is a match between the one or more obtained images and the reference record. For example, the match score may be compared to a threshold. A match may reflect a high likelihood that the user whose eye is depicted in the one or more obtained images is the same as an individual associated with the reference record. For example, a robust threshold may be used that corresponds to a point in a neighborhood of a three-dimensional receiver operating curve generated from a sensitivity analysis.

If there is no match, then the user may be rejected 614. As a result, the user may be denied access to a secure device or service (e.g., secured device 450 or secure transaction service 523). In some implementations, the user may be informed of the rejection 614 through a message that is shown on a display or played through a speaker. In some implementations, the rejection may be affected by transmitting a message through a network reflecting the status of the user as rejected. For example, the authentication module 540, upon rejecting user 530 may transmit a rejection message to the secure transaction server 523 using a network interface of server system 514. The authentication module 540 may also send a rejection message to user computing device 510 in this scenario.

If there is a match, then the user may be accepted 616. As a result, the user may be granted access to a secure device or service (e.g., secured device 450 or secure transaction service 523). In some implementations, the user may be informed of the acceptance 616 through a message that is shown on a display or played through a speaker. In some implementations, the acceptance may be affected by transmitting a message through a network reflecting the status of the user as accepted. For example, the authentication module 540, upon accepting user 530 may transmit an acceptance message to the secure transaction server 523 using a network interface of server system 514. The authentication module 540 may also send an acceptance message to user computing device 510 in this scenario.

Figure 7:
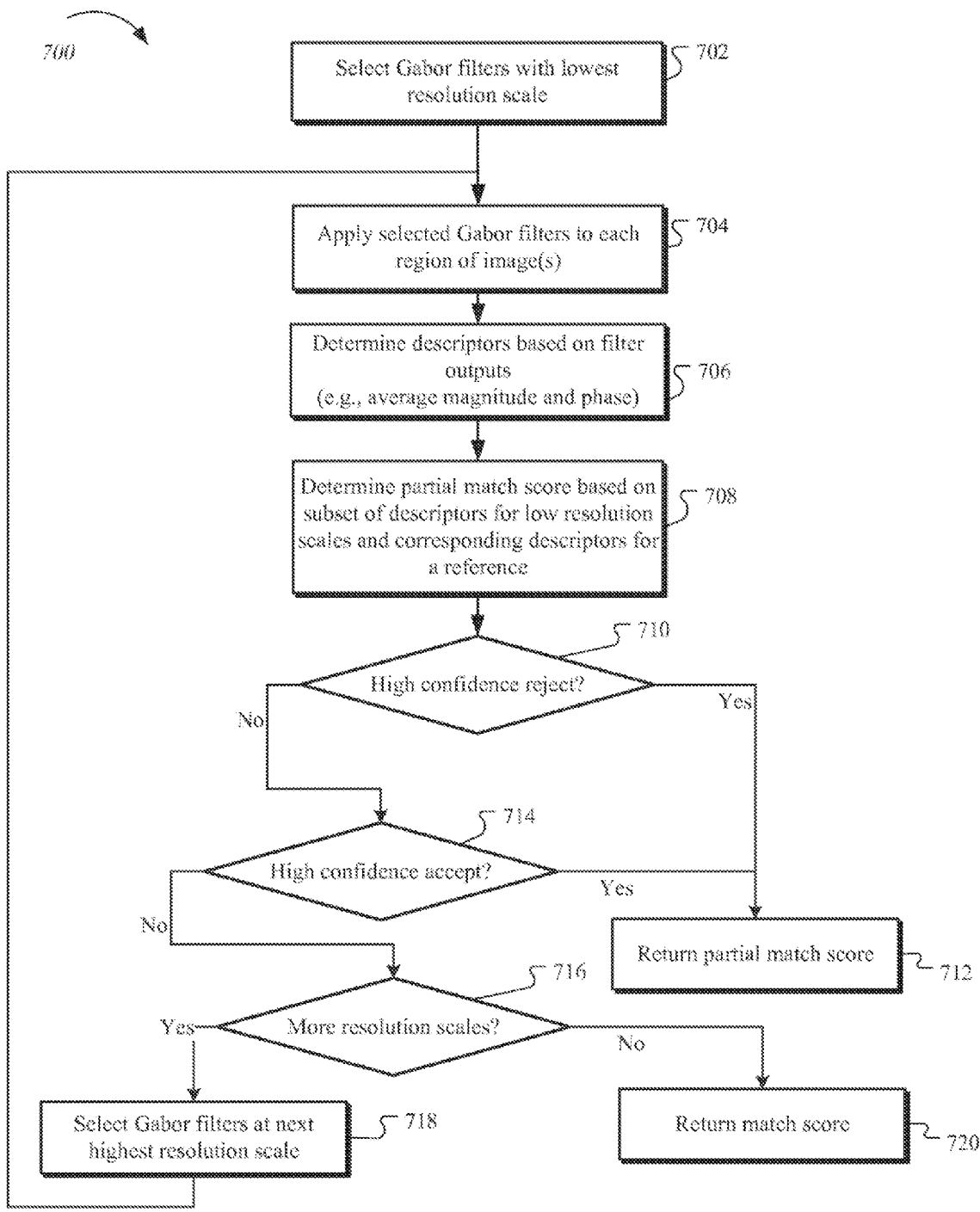
FIG. 7 is a flow chart of an example process for determining a match score for one or more images of an eye.

FIG. 7 is a flow chart of an example process 700 for determining a match score for one or more images of an eye. Sets of Gabor filters at each of a sequence of resolution scales is applied 704 to one or more images including views of regions of interest on the whites of an eye. Descriptors are determined 706 based on the filter outputs and a partial match score is determined by comparing the descriptors to corresponding descriptors from a reference record. At each resolution level, the partial match score is checked for high confidence acceptance or high confidence rejection to determine whether the partial score will be returned as the final match score or to apply the next set of Gabor filters at the next highest resolution scale. This process repeats until a high confidence match score results or the highest available resolution of Gabor filters have been applied.

The process 700 can be implemented, for example, by the authentication module 440 in the computing device 430 of FIG. 4. In some implementations, the computing device 430 is a data processing apparatus that includes one or more processors that are configured to perform actions of the process 700. For example, the data processing apparatus may be a computing device (e.g., as illustrated in FIG. 9). In some implementations, process 700 may be implemented in whole or in part by the authentication application 550 that is executed by a user computing device (e.g., computing device 510). For example, the user computing device may be a mobile computing device (e.g., mobile computing device 950 of FIG. 9). In some implementations, process 700 may be implemented in whole or in part by the authentication module 540 that is executed by a user server system (e.g., server system 514). In some implementations, the server system 514 is a data processing apparatus that includes one or more processors that are configured to perform actions of the process 700. For example, the data processing apparatus may be a computing device (e.g., as illustrated in FIG. 9). In some implementations, a computer readable medium can include instructions that when executed by a computing device (e.g., a computer system) cause the device to perform actions of the process 700.

A first set of Gabor filters with low resolution scale are selected 702 for use in extracting descriptors from one or more images including a view of the white of an eye. Gabor filters have complex kernels that are used to convolve input images. The real part of the Gabor kernel is given by $$g(x, y, \lambda, \theta, \sigma, \gamma) = \exp\left(\frac{-(x'^2 + \gamma^2 y'^2)}{2\sigma^2}\right) * \cos\left(2\pi \frac{x'}{\lambda}\right)$$

And the imaginary part is given by $$g(x, y, \lambda, \theta, \sigma, \gamma) = \exp\left(\frac{-(x'^2 + \gamma^2 y'^2)}{2\sigma^2}\right) * \sin\left(2\pi \frac{x'}{\lambda}\right)$$

Where x and y are the image pixel coordinates, $\lambda$ is spatial frequency, $\theta$ is kernel orientation, $\sigma$ is kernel spread (standard deviation), and $\gamma$ is spatial aspect ratio, and $$x' = x*\cos\theta + y*\sin\theta$$

$$y' = -x*\sin\theta + y*\cos\theta$$

The resolution scale of the Gabor filters is controlled primarily by the kernel spread ($\sigma$) parameter. In some implementations, the first set of Gabor filters are selected with $\theta = \{0°, 30°, 60°, 90°, 120°, 150°\}$, $\sigma = 20$ Pixels, $\lambda = 6$; and $\gamma = 1$. The Gabor filter parameters may be selected to match corresponding Gabor filters that were used to derive descriptors stored in a reference record.

The choice of frequency may be dependent on the distance between vessels, which in turn depends on the resolution and distance between image acquisition system and the subject. These parameters may be invariant to images. For example, the kernel parameters may be derived for eye images captured at a distance of 6-12 centimeters away from the eye using a particular sensor (e.g. a back camera on a smartphone) and the segmented sclera region can be resized to a resolution of (e.g., 401×501 pixels) for the analysis. Visible eye surface vasculature may be spread in all the directions on white of the eye.

The selected set of Gabor filters are applied 704 to each of the regions in the image that has been selected for analysis by segmentation. For example, the one or more images may be encoded as two, three, or four dimensional arrays of image data elements (e.g., a pixel, a voxel, a ray, or a red, green or blue channel value). As discussed above, the images may be segmented by identifying regions of interest (e.g., areas of the white of the eye left or right of the iris) in the obtained images and further segmenting these regions of interest into smaller regions called tiles. In some implementations, tiles are analyzed using the Gabor filters and descriptors are derived from the filter outputs corresponding to each tile. The filters may be applied 704 by convolving each Gabor kernel with the input images or each tile or other selected regions from the input images. In some implementations, the convolution operation may be carried out by multiplying frequency domain representations of the input images and the Gabor kernels and then transforming the result back to the space domain. For example, the Gabor filters may be applied 704 by an authentication module or application (e.g., authentication module 440).

Descriptors are determined 706 from the outputs of the Gabor filters for each selected region of the images. The outputs of the Gabor filters may be complex. In some implementations, the average or median magnitude of the image data elements in a tile of a Gabor filter output is taken as a descriptor. In some implementations, the average or median phase of the image data elements in a tile of a Gabor filter output is taken as a descriptor. In some implementations the set of descriptors for each tile or other selected region assembled to form a vector of descriptors. The vector of descriptors may describe a visible eye vasculature in a feature space. For example, descriptors may be determined 706 by an authentication module or application (e.g., authentication module 440).

A partial match score is determined 708 based on a subset of descriptors for the low resolution scale(s) that have been processed thus far and corresponding descriptors from a reference record. At the first iteration, descriptors from the lowest resolution scale filters are is compared to corresponding descriptors from a reference record. At each successive iteration, additional descriptors for the next highest resolution scale filters are added to the analysis along with their corresponding descriptors from the reference file. In some implementations, the number of elements in a descriptor vector is expanded at each iteration and the descriptor vector is compared to a corresponding descriptor vector from the reference record. The elements of the vector from the reference record may be selected from a possibly larger set of stored descriptors by using descriptors for tiles that are co-registered (i.e., corresponding to the same local area of the white of the eye with a position that is specified in relation to the iris or other landmarks) with the tiles for corresponding descriptors in the determined descriptor vector. In some implementations, a partial match score may be determined 708 as a distance (e.g., a Euclidian distance, a correlation coefficient, modified Hausdorff distance, Mahalanobis distance, Bregman divergence, cosine similarity, Kullback-Leibler distance, and Jensen-Shannon divergence) between the determined vector of descriptors extracted from the images and a vector of descriptors from the reference record. In some implementations, the partial match score may be determined 807 by inputting the determined descriptor vector and descriptor vector from the reference record to a trained function approximator.

The function approximator may be trained using data corresponding to training images eyes of a registered individual associated with a reference record and other non-registered individuals that have been correctly labeled to provide a desired output signal reflecting whether there is a match with the reference record. The function approximator models the mapping from input data (i.e., the training image descriptors) to output data (i.e., a partial match score) with a set of model parameters. The model parameter values are selected using a training algorithm that is applied to the training data. For example, the function approximator may be based the following models: linear regression, Volterra series. Wiener series, radial basis functions, kernel methods, polynomial methods; piecewise linear models, neural networks, support vector machines, or fuzzy function approximator.

In some implementations, the determined descriptor vector is compared against multiple alternative descriptor vectors from a reference record and the average or best partial match score is used.

For example, partial match score may be determined 708 by an authentication module is or application (e.g., authentication module 440).

The partial match score may be checked 710 for a high confidence reject. In some implementations, the partial match score is compared to a threshold (e.g., 0.3) that corresponds to a high confidence level in rejecting the user or a very low likelihood of a match between the user and the reference record. For example, the threshold may be set to a value obtained using an operating point on an receiver operation characteristic (ROC) curve of a classifier (generated using training data for the selected descriptors) at 0 false reject point. If the partial match score is worse than the threshold, the partial match score is returned 712, possibly after translation to a different scale, and may be used by a calling process to reject the user.

In some implementations, a higher probability of error can be tolerated and the threshold may be obtained using a different point on the ROC curve corresponding to a non-zero but acceptably small level of error.

Otherwise, the partial match score may be checked 714 for a high confidence accept. In some implementations, the partial match score is compared to a threshold (e.g., 0.65) that corresponds to a high confidence level in accepting the user or a very high likelihood of a match between the user and the reference record. For example, the threshold may be set to a value obtained using an operating point on an ROC curve of a classifier (generated using training data for the selected descriptors) at 0 false accept point. If the partial match score is better than the threshold, the partial match score is returned 712 and may be used by a calling process to accept the user.

Otherwise, if 716 higher resolution scale Gabor filters have yet to be applied to the images, then a set of the next highest resolution scale Gabor filters is selected 718. For example, available resolution scales may correspond to $\sigma=\{20, 10, 5, 2.5\}$ pixels. Other parameters of the Gabor filters may also be varied. The next selected set of Gabor filters is then applied 704 in the next iteration of the process 700.

If 716 higher resolution scale Gabor filters are not available (i.e., there is no corresponding descriptor data in the reference record), then the last partial match score is returned 720 as the match score, possibly after translation to a different scale, and may be used by a calling process to accept or reject the user.

Figure 8A:
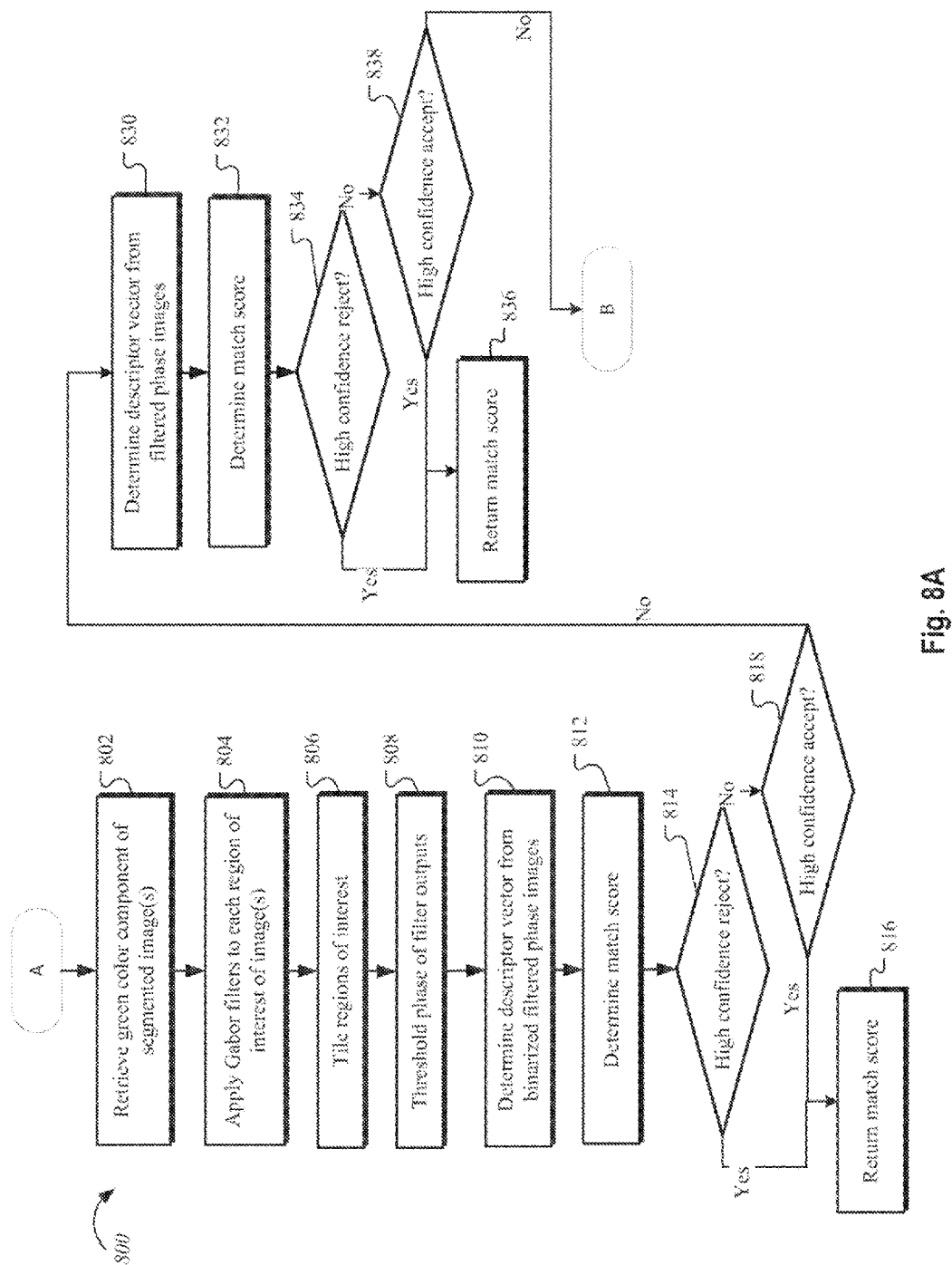
FIGS. 8A-8B are a flow chart of an example process for determining a match score for one or more images of an eye.
Figure 8B:
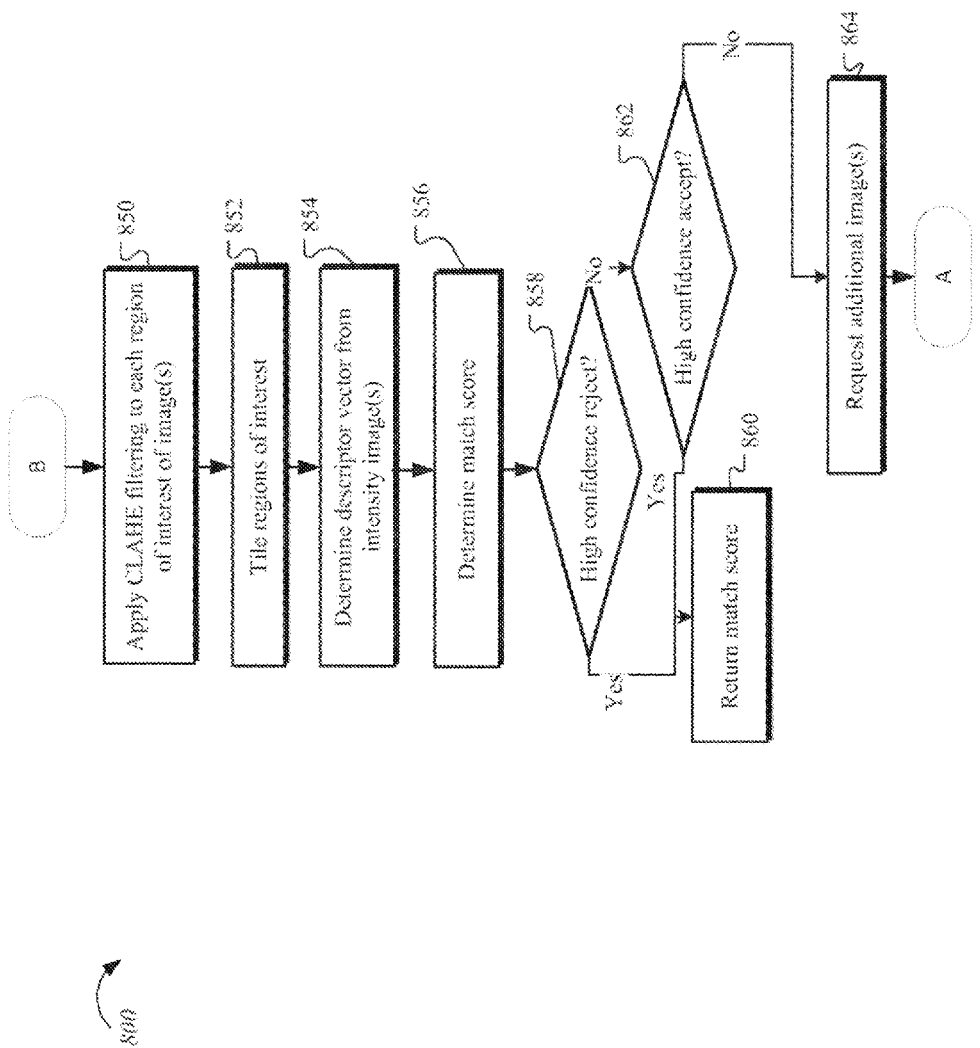

FIGS. 8A and 8B are a flow chart of an example process 800 for determining a match score for one or more images of an eye. The example process applies a conditionally executed three layer cascade of filters to determine match scores based on descriptors derived from the filter outputs. For example, the process 800 may be implemented by an authentication module or application (e.g., authentication module 440).

The green color component of the one or more images is retrieved 802. The green component may exhibit a particularly high contrast level for vasculature of the white of the eye. The images may have been previously segmented to identify one or more regions of interest (e.g. areas of the white of the eye to the left and right of the iris). The green color component in these regions of interest is extracted and passed on to a first cascaded filter bank.

A bank of complex Gabor filters is applied 804 to the green images in the regions of interest. The filters may be applied 804 by convolving each Gabor kernel with the input images. In some implementations, the convolution operation may be carried out by multiplying frequency domain representations of the input images and the Gabor kernels and then transforming the result back to the space domain. In some implementations, six Gabor filters are used, each with a different kernel orientation θ. For example, Gabor filters with $\theta=\{0°, 30°, 60°, 90°, 120°, 150°\}$, $\sigma$2.5 Pixels, $\lambda=6$; and $\gamma=1$ may be applied 804 to the regions of interest in the images. In some implementations, the phase of the complex filter outputs is determined for each image data element (e.g., each pixel) using and arctangent function.

The regions of interest in the resulting phase images are tiled 806 in to small sub-regions. For example a region of interest corresponding to white of the eye left of the iris may be tiled 806 into approximately 80 tiles arranged in an 8 by 10 grid, where each tile may be 50 pixels by 50 pixels, In some implementations, these some of these tiles near the edges of the exposed sclera region may be eliminated. For example, tiles with less than 80% of their image data elements within the sclera region may be dropped. In some cases, portions of a tile area may be occluded by glare or eyelash artifacts, which if severe enough may result in the tile being eliminated.

The phase of the tiled phase images is then thresholded 808 to convert the phase images into binary images (i.e., images with data elements that take on one of two possible values). The phase of the Gabor-filtered images may vary from $-\pi$ to $+\pi$ radians. For is example, phase values above 0.25 and below $-0.25$ radians may correspond to vascular structures. To binarize the phase image using thresholding, all values of phase above 0.25 or below $-0.25$ may be set to one and the remaining values to zero. This may result in a sharp vasculature structure in corresponding phase image. This operation can be performed for images resulting from applications of all six Gabor kernels at different angles.

A vector of descriptors is determined 810 based on the binarized filtered phase images from each of the Gabor filters. The sum of all the 1's in a binarized image area (e.g., a tile) divided by the area of region of interest may reflect the extent of the visible vasculature. In some implementations, the mean of the binarized image data element values in each tile is determined and taken as a descriptor. The set of mean values for each tile may be combined to form a descriptor vector. For example, the images of a single eye may include two regions of interest (e.g. left and right of the iris), each with six orientation angles (θ), each with 80 tiles (8×10 grid), resulting in a descriptor vector with 960 elements or descriptors.

A match score is determined 812 by comparing the determined descriptor vector to a reference descriptor vector from a reference record. The elements of the vector from the reference record may be selected from a possibly larger set of stored descriptors by using descriptors for tiles that are co-registered (i.e., corresponding to the same local area of the white of the eye with a position that is specified in relation to the iris or other landmarks) with the tiles for corresponding descriptors in the determined descriptor vector. In some implementations, a match score may be determined 812 as a distance (e.g. a Euclidian distance, a correlation coefficient, modified Hausdorff distance. Mahalanobis distance, Bregman divergence, cosine similarity, Kullback-Leibler distance, and Jensen-Shannon divergence) between the determined vector of descriptors extracted from the images and a vector of descriptors from the reference record. In some implementations, the match score may be determined 812 by inputting the determined descriptor vector and descriptor vector from the reference record to a trained function approximator. In some implementations, the determined descriptor vector is compared against multiple alternative descriptor vectors from a reference record and the average or best match score is used.

This first match score may be checked 814 for a high confidence reject. In some implementations, the first match score is compared to a threshold (e.g., 0.3) that corresponds to a high confidence level in rejecting the user or a very low likelihood of a match between the user and the reference record. For example, the threshold may be set to a value obtained using an operating point on an receiver operation characteristic (ROC) curve of a classifier (generated using training data for the first layer of the cascade) at 0 false reject point. If the first match score is worse than the threshold, the first match score is returned 816, possibly after translation to a different scale, and may be used by a calling process to reject the user.

Otherwise, the first match score may be checked 818 for a high confidence accept. In some implementations, the first match score is compared to a threshold (e.g., 0.65) that corresponds to a high confidence level in accepting the user or a very high likelihood of a match between the user and the reference record. For example, the threshold may be set to a value obtained using an operating point on an ROC curve of a classifier (generated using training data for the first layer of the cascade) at 0 false accept point. If the first match score is better than the threshold, the first match score is returned 816, possibly after translation to a different scale, and may be used by a calling process to accept the user. Otherwise, the second layer of the conditionally executed cascade of filters is applied.

In this example, the second layer uses the same Gabor filters operating on the same green color component input images, so the previously determined filtered phase images can be reused. In general, different filter banks may be used at each layer of the cascade.

In the second layer of the cascade, a second descriptor vector is determined 830 based on the filtered phase images that have not been binarized, i.e. the image data elements take on more than two possible values. A descriptor is determined for each tile of each filter output for each region of interest by determining a mean of the phase values within the tile. The second descriptor vector is formed from the set of descriptors for each of these tiles.

A second match score is determined 832 by comparing the determined descriptor vector to a reference descriptor vector from a reference record. The elements of the vector from the reference record may be selected from a possibly larger set of stored descriptors by using descriptors for tiles that are co-registered (i.e., corresponding to the same local area of the white of the eye with a position that is specified in relation to the iris or other landmarks) with the tiles for corresponding descriptors in the determined descriptor vector. In some is implementations, a second match score may be determined 812 as a distance (e.g., a Euclidian distance, a correlation coefficient, modified Hausdorff distance, Mahalanobis distance. Bregman divergence, cosine similarity, Kullback-Leibler distance, and Jensen-Shannon divergence) between the determined vector of descriptors extracted from the images and a vector of descriptors from the reference record. In some implementations, the second match score may be determined 832 by inputting the determined descriptor vector and descriptor vector from the reference record to a trained function approximator. In some implementations, the determined descriptor vector is compared against multiple alternative descriptor vectors from a reference record and the average or best match score is used.

The second match score may be checked 834 for a high confidence reject. In some implementations, the second match score is compared to a threshold (e.g., 0.45) that corresponds to a high confidence level in rejecting the user or a very low likelihood of a match between the user and the reference record. For example, the threshold may be set to a value obtained using an operating point on an ROC curve of a classifier (generated using training data for the second layer of the cascade) at 0 false reject point. If the second match score is worse than the threshold, the second match score is returned 836, possibly after translation to a different scale, and may be used by a calling process to reject the user.

Otherwise, the second match score may be checked 838 for a high confidence accept. In some implementations, the second match score is compared to a threshold (e.g., 0.8) that corresponds to a high confidence level in accepting the user or a very high likelihood of a match between the user and the reference record. For example, the threshold may be set to a value obtained using an operating point on an ROC curve of a classifier (generated using training data for the second layer of the cascade) at 0 false accept point. If the second match score is better than the threshold, the second match score is returned 816, possibly after translation to a different scale, and may be used by a calling process to accept the user. Otherwise, the third layer of the conditionally executed cascade of filters is applied.

Referring now to FIG. 8B, CLAHE filtering is applied 850 to green color components for each of the regions of interest in the obtained images. The enhanced green images are tiled 852 into small sub-regions. For example a region of interest corresponding to white of the eye left of the iris may be tiled 806 into approximately 80 tiles arranged in an 8 by 10 grid, where each tile may be 50 pixels by 50 pixels. In some implementations, these some of these tiles near the edges of the exposed sclera region may be eliminated. For example, tiles with less than 80% of their image data elements within the sclera region may be dropped. In some cases, portions of a tile area may be occluded by glare or eyelash artifacts, which if severe enough may result in the tile being eliminated.

A vector of descriptors is determined 854 based on the enhanced green images. The average intensity of the enhanced green images in a tile may reflect the extent of the visible vasculature in the tile. In some implementations, the mean of the image data element values in each tile is determined and taken as a descriptor. The set of mean values for each tile may be combined to form a descriptor vector. For example, the images of a single eye may include two regions of interest (e.g. left and right of the iris), each with 80 tiles (8×10 grid), resulting in a descriptor vector with 160 elements or descriptors.

A third match score is determined 856 by comparing the determined descriptor vector to a reference descriptor vector from a reference record. The elements of the vector from the reference record may be selected from a possibly larger set of stored descriptors by using descriptors for tiles that are co-registered (i.e., corresponding to the same local area of the white of the eye with a position that is specified in relation to the iris or other landmarks) with the tiles for corresponding descriptors in the determined descriptor vector. In some implementations, a third match score may be determined 856 as a distance (e.g., a Euclidian distance, a correlation coefficient, modified Hausdorff distance, Mahalanobis distance, Bregman divergence, cosine similarity, Kullback-Leibler distance, and Jensen-Shannon divergence) between the determined vector of descriptors extracted from the images and a vector of descriptors from the reference record. In some implementations, the third match score may be determined 856 by inputting the determined descriptor vector and descriptor vector from the reference record to a trained function approximator.

The third match score may be checked 858 for a high confidence reject. In some implementations, the third match score is compared to a threshold (e.g., 0.82) that corresponds to a high confidence level in rejecting the user or a very low likelihood of a match between the user and the reference record. For example, the threshold may be set to a value obtained using an operating point on an ROC curve of a classifier (generated using training data for the third layer of the cascade) at 0 false reject point. If the third match score is worse than the threshold, the third match score is returned 860, possibly after translation to a different scale, and may be used by a calling process to reject the user. In some implementations, the determined descriptor vector is compared against multiple alternative descriptor vectors from a reference record and the average or best match score is used.

Otherwise, the third match score may be checked 862 for a high confidence accept. In some implementations, the third match score is compared to a threshold (e.g., 0.86) that corresponds to a high confidence level in accepting the user or a very high likelihood of a match between the user and the reference record. For example, the threshold may be set to a value obtained using an operating point on an ROC curve of a classifier (generated using training data for the third layer of the cascade) at 0 false accept point. If the third match score is better than the threshold, the third match score is returned 860, possibly after translation to a different scale, and may be used by a calling process to accept the user.

Otherwise, additional images are requested 864 the first layer of the conditionally executed cascade of filters is applied to the additional images. In some implementations, additional images may have been previously captured and are retrieved from a calling process or a remote device (e.g. user computing device 510). In some implementations, additional images may be captured by prompting a user (e.g., using display 424) to submit more images through a sensor (e.g. light sensor 420).

In some implementations, not shown, the conditional cascade of filters may include additional layers with different filters, with each layer using confidence thresholds set at 0 false reject and 0 false accept points on ROC curves for that stage.

FIG. 9 shows an example of a generic computer device 900 and a generic mobile computing device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and is a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or a memory on processor 902, for example.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion is port, which may include various communication ports (e.g., USB, Bluetooth, Ethernet, wireless Ethernet) may be coupled to one or more input/output devices, such as a keyboard, a pointing device, a scanner, or a networking device such as a switch or router. e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and is convert them for submission to the processor 952. In addition, an external interface 962 may be provided in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provided as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g. voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network).

Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer implemented method comprising:
   obtaining one or more first image regions of a first image of an eye, wherein each of the first image regions includes a view of a respective portion of vasculature of the eye;
   training a classifier using a training algorithm and descriptors derived from filters applied to eye images;
   determining a confidence threshold of the trained classifier based on a false reject or a false accept point of a receiver operating characteristic curve generated from a sensitivity analysis of the classifier; and
   until a score exceeds the confidence threshold, progressively increasing a filter resolution and calculating the score based on the filter resolution as follows:
      applying a plurality of filters having the filter resolution to the first image regions to generate filter output;
      deriving a plurality of first descriptors from the filter output;
      defining a plurality of second descriptors derived from second image regions of a second image of an eye, the second image regions comprising regions that are co-registered with the first image regions for corresponding descriptors in the plurality of first descriptors; and
      providing the first descriptors and at least a subset of the second descriptors as input to the classifier and obtaining the score as output of the classifier.

2. The method of claim 1 wherein applying the plurality of filters comprises convolving the filters with the first image regions to generate the filter output.

3. The method of claim 2 wherein convolving the filters with the first image regions comprises multiplying frequency domain representations of the first image regions with the filters' kernels and then transforming the results to the spatial domain to generate the filter output.

4. The method of claim 1 wherein the filters are Gabor filters.

5. The method of claim 4 wherein each of the filters has a different orientation.

6. The method of claim 1 wherein a particular first descriptor is an average or median magnitude of image data elements of a portion of the filter output.

7. The method of claim 1 wherein a particular first descriptor is an average or median phase of image data elements of a portion of the filter output.

8. The method of claim 1 wherein the score is calculated based on a distance between the first descriptors and the at least a subset of the second descriptors.

9. The method of claim 8 wherein the distance is a Euclidian distance, a correlation coefficient, a modified Hausdorff distance, a Mahalanobis distance, a Bregman divergence, a cosine similarity, a Kullback-Leibler distance, or a Jensen-Shannon divergence.

10. A system comprising:
    data processing apparatus programmed to perform operations comprising:
       obtaining one or more first image regions of a first image of an eye, wherein each of the first image regions includes a view of a respective portion of vasculature of the eye;
       training a classifier using a training algorithm and descriptors derived from filters applied to eye images;
       determining a confidence threshold of a trained classifier based on a false reject or a false accept point of a receiver operating characteristic curve generated from a sensitivity analysis of the classifier;
       until a score exceeds the confidence threshold, progressively increasing a filter resolution and calculating the score based on the filter resolution as follows:
          applying a plurality of filters having the filter resolution to the first image regions to generate filter output;
          deriving a plurality of first descriptors from the filter output;
          defining a plurality of second descriptors derived from second image regions of a second image of an eye, the second image regions comprising regions that are co-registered with the first image regions for corresponding descriptors in the plurality of first descriptors; and
          providing the first descriptors and at least a subset of the second descriptors as input to the classifier and obtaining the score as output of the classifier.

11. The system of claim 10 wherein applying the plurality of filters comprises convolving the filters with the first image regions to generate the filter output.

12. The system of claim 11 wherein convolving the filters with the first image regions comprises multiplying frequency domain representations of the first image regions with the filters' kernels and then transforming the results to the spatial domain to generate the filter output.

13. The system of claim 10 wherein the filters are Gabor filters.

14. The system of claim 13 wherein each of the filters has a different orientation.

15. The system of claim 10 wherein a particular first descriptor is an average or median magnitude of image data elements of a portion of the filter output.

16. The system of claim 10 wherein a particular first descriptor is an average or median phase of image data elements of a portion of the filter output.

17. The system of claim 10 wherein the score is calculated based on a distance between the first descriptors and the at least a subset of the second descriptors.

18. The system of claim 17 wherein the distance is a Euclidian distance, a correlation coefficient, a modified Hausdorff distance, a Mahalanobis distance, a Bregman divergence, a cosine similarity, a Kullback-Leibler distance, or a Jensen-Shannon divergence.

19. A program product stored on a non-transitory computer-readable medium, the program product comprising instructions that, when executed by data processing apparatus, cause the data processing apparatus to perform operations comprising:

obtaining one or more first image regions of a first image of an eye, wherein each of the first image regions includes a view of a respective portion of vasculature of the eye;

training a classifier using a training algorithm and descriptors derived from filters applied to eye images;

determining a confidence threshold of a trained classifier based on a false reject or a false accept point of a receiver operating characteristic curve generated from a sensitivity analysis of the classifier;

until a score exceeds the confidence threshold, progressively increasing a filter resolution and calculating the score based on the filter resolution as follows:

applying a plurality of filters having the filter resolution to the first image regions to generate filter output;

deriving a plurality of first descriptors from the filter output;

defining a plurality of second descriptors derived from second image regions of a second image of an eye, the second image regions comprising regions that are co-registered with the first image regions for corresponding descriptors in the plurality of first descriptors; and providing the first descriptors and at least a subset of the second descriptors as input to the classifier and obtaining the score as output of the classifier.

20. The program product of claim 19 wherein applying the plurality of filters comprises convolving the filters with the first image regions to generate the filter output.

21. The program product of claim 20 wherein convolving the filters with the first image regions comprises multiplying frequency domain representations of the first image regions with the filters' kernels and then transforming the results to the spatial domain to generate the filter output.

22. The program product of claim 19 wherein the filters are Gabor filters.

23. The program product of claim 22 wherein each of the filters has a different orientation.

24. The program product of claim 19 wherein a particular first descriptor is an average or median magnitude of image data elements of a portion of the filter output.

25. The program product of claim 19 wherein a particular first descriptor is an average or median phase of image data elements of a portion of the filter output.

26. The program product of claim 19 wherein the score is calculated based on a distance between the first descriptors and the at least a subset of the second descriptors.

27. The program product of claim 26 wherein the distance is a Euclidian distance, a correlation coefficient, a modified Hausdorff distance, a Mahalanobis distance, a Bregman divergence, a cosine similarity, a Kullback-Leibler distance, or a Jensen-Shannon divergence.

* * * * *